United States Patent
Sone et al.

(10) Patent No.: US 9,654,434 B2
(45) Date of Patent: May 16, 2017

(54) MESSAGE ORIGINATING SERVER, MESSAGE ORGINATING METHOD, TERMINAL, ELECTRIC APPLIANCE CONTROL SYSTEM, AND ELECTRIC APPLIANCE

(71) Applicant: SHARP KABUSHIKI KAISHA, Osaka-shi Osaka (JP)

(72) Inventors: Motoki Sone, Osaka (JP); Yuka Hayano, Osaka (JP); Kasumi Hatayama, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 352 days.

(21) Appl. No.: 14/027,800

(22) Filed: Sep. 16, 2013

(65) Prior Publication Data
US 2014/0095164 A1 Apr. 3, 2014

(30) Foreign Application Priority Data

Oct. 1, 2012 (JP) ................................ 2012-219842
Oct. 1, 2012 (JP) ................................ 2012-219849

(51) Int. Cl.
| | | |
|---|---|---|
| G06F 15/16 | (2006.01) |
| H04L 12/58 | (2006.01) |
| H04L 12/28 | (2006.01) |
| H04L 29/08 | (2006.01) |
| H04N 7/00 | (2011.01) |

(52) U.S. Cl.
CPC .......... *H04L 51/16* (2013.01); *H04L 12/2818* (2013.01); *H04L 12/2825* (2013.01); *H04L 12/2829* (2013.01); *H04L 67/12* (2013.01); *H04N 7/00* (2013.01)

(58) Field of Classification Search
None
See application file for complete search history.

(56) References Cited

U.S. PATENT DOCUMENTS

| | | | | |
|---|---|---|---|---|
| 6,807,260 | B2* | 10/2004 | Reindle ................... | H04M 1/50 379/142.01 |
| 2001/0025349 | A1* | 9/2001 | Sharood ............. | G06Q 30/0235 713/340 |
| 2001/0054291 | A1* | 12/2001 | Roh ........................ | G10L 15/26 62/126 |
| 2004/0058694 | A1* | 3/2004 | Mendiola ............... | G06Q 30/02 455/466 |

(Continued)

FOREIGN PATENT DOCUMENTS

| | | |
|---|---|---|
| CN | 201312348 Y | 9/2009 |
| JP | 2003-316669 A | 11/2003 |

(Continued)

*Primary Examiner* — Viet Vu
*Assistant Examiner* — James Edwards
(74) *Attorney, Agent, or Firm* — Birch, Stewart, Kolasch & Birch, LLP

(57) ABSTRACT

A control server (1) causes an analyzing section (15) to analyze (i) at least either of sensor information from a household sensor (10) and operation information on a household electric appliance and (ii) external information, and then originates a message to be directed to a user, the message being generated by a message generating section (16) in correspondence with the result of the analysis.

15 Claims, 9 Drawing Sheets

(56) References Cited

U.S. PATENT DOCUMENTS

| | | | | |
|---|---|---|---|---|
| 2004/0216472 A1* | 11/2004 | Cho | ......................... | A23B 7/10 62/126 |
| 2004/0254997 A1* | 12/2004 | Katano | ............... | G06F 11/1438 709/206 |
| 2006/0232671 A1* | 10/2006 | Yasunaga | ........... | H04N 7/17318 348/143 |
| 2007/0156256 A1* | 7/2007 | Jung | ...................... | G05B 15/02 700/19 |
| 2007/0192910 A1* | 8/2007 | Vu | .......................... | B25J 5/007 700/245 |
| 2008/0028430 A1* | 1/2008 | Kreiner | ................ | H04N 5/4403 725/78 |
| 2009/0013699 A1* | 1/2009 | Kim | ........................ | F25D 23/12 62/66 |
| 2009/0018698 A1* | 1/2009 | Kim | ..................... | G05D 1/0011 700/247 |
| 2009/0070283 A1* | 3/2009 | Kang | ................... | G06N 99/005 706/45 |
| 2009/0243852 A1* | 10/2009 | Haupt | ..................... | G01W 1/00 340/541 |
| 2010/0094652 A1* | 4/2010 | Dorsett | ................. | G06F 19/322 705/3 |
| 2011/0010182 A1* | 1/2011 | Turski | ................. | G06Q 10/107 705/1.1 |
| 2011/0196547 A1* | 8/2011 | Park | ....................... | G06Q 50/06 700/296 |
| 2012/0087496 A1* | 4/2012 | Lo | ....................... | H04L 12/2827 380/210 |
| 2013/0173076 A1* | 7/2013 | Pan | ........................... | H02J 3/14 700/292 |

FOREIGN PATENT DOCUMENTS

| | | |
|---|---|---|
| JP | 2005-92540 A | 4/2005 |
| JP | 2006-235886 A | 9/2006 |
| JP | 2010-275832 A | 12/2010 |

\* cited by examiner

F I G. 1
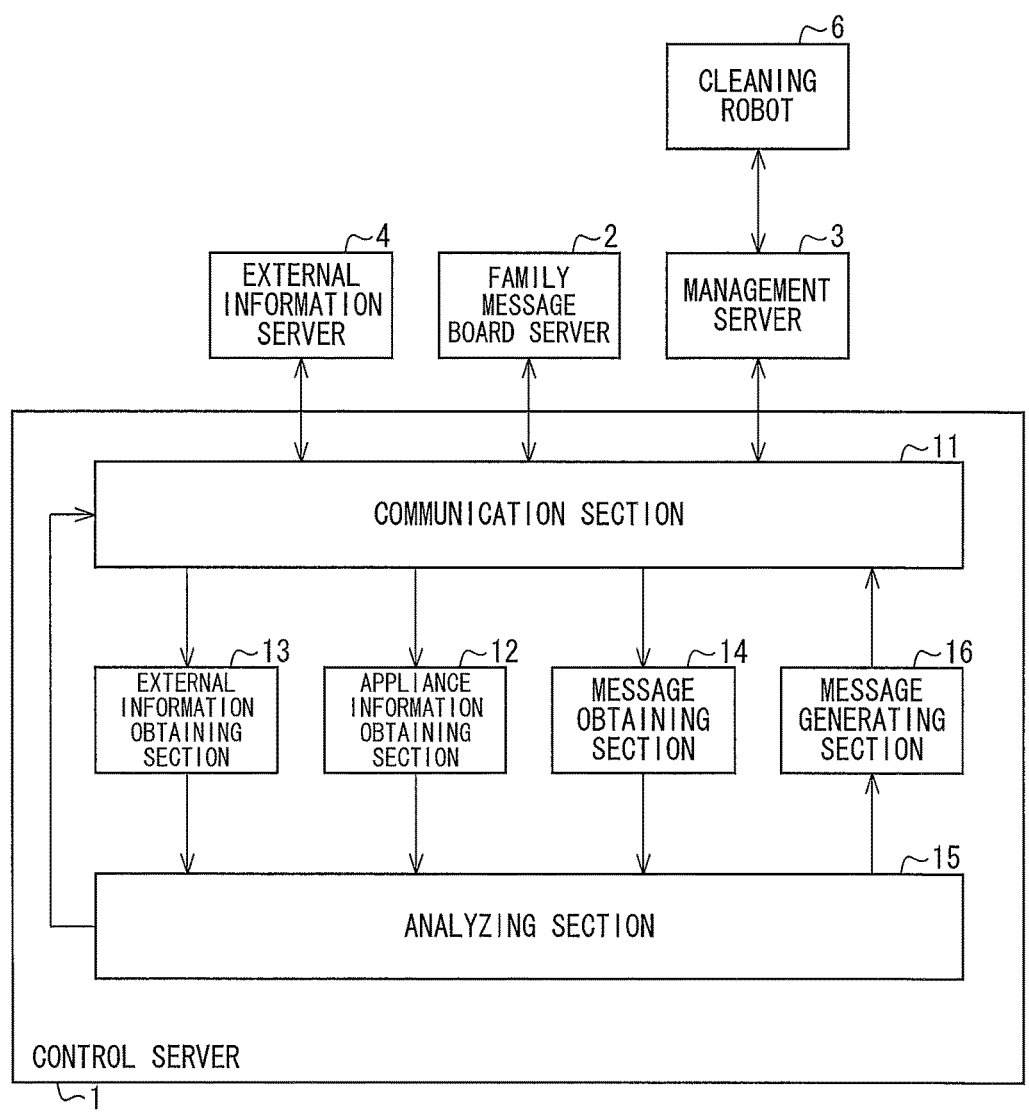

| No | SENSOR INFORMATION | EXTERNAL INFORMATION | SUGGESTION, RECOMMENDATION, PROPOSAL |
|---|---|---|---|
| 1 | "room temperature at 30°C" | "heat stroke warning in effect over entire prefecture" | "turn on air conditioner" |
| 2 | "room temperature at 27°C" | "high temperature forecast today at 26°C" | "turn off air conditioner" |
| ⋮ | ⋮ | ⋮ | ⋮ |

(b)

| No | INFORMATION INCLUDED IN MESSAGE | MESSAGE CONTENT |
|---|---|---|
| 1 | "turn on", "air conditioner" | operation instruction: instruction to turn on the air conditioner |
| 2 | "turn off", "air conditioner" | operation instruction: instruction to turn off the air conditioner |
| ⋮ | ⋮ | ⋮ |

(c)

| No | SUGGESTION, RECOMMENDATION, PROPOSAL | MESSAGE |
|---|---|---|
| 1 | "turn on air conditioner" | "Turn on air conditioner?" |
| 2 | "turn off air conditioner" | "Turn off air conditioner?" |
| ⋮ | ⋮ | ⋮ |

(d)

| No | MESSAGE CONTENT | MESSAGE |
|---|---|---|
| 1 | operation instruction: instruction to turn on the air conditioner | "Air conditioner turned on" |
| 2 | operation instruction: instruction to turn off the air conditioner | "Air conditioner turned off" |
| ⋮ | ⋮ | ⋮ |

MESSAGE ORIGINATING SERVER, MESSAGE ORGINATING METHOD, TERMINAL, ELECTRIC APPLIANCE CONTROL SYSTEM, AND ELECTRIC APPLIANCE

This Nonprovisional application claims priority under 35 U.S.C. §119 on Patent Application No. 2012-219842 filed in Japan on Oct. 1, 2012 and Patent Application No. 2012-219849 filed in Japan on Oct. 1, 2012, the entire contents of which are hereby incorporated by reference.

TECHNICAL FIELD

The present invention relates to a message originating server, a message originating method, a terminal, an electric appliance control system, and an electric appliance.

BACKGROUND ART

There is widespread use of household electric appliances (home electric appliances) nowadays, so that people's lives involve diverse home electric appliances. Such home electric appliances are currently operated all by their users. For instance, (i) a television is turned on and off or (ii) the set temperature for an air conditioner is changed, both by the user operating a remote control or the like for an individual home electric appliance.

For such an operation, the user needs to personally gather, from a sensor provided to an individual home electric appliance or the like, information such as (i) sensor information (for example, room-temperature information and humidity information) generated by the sensor and (ii) operation information on the individual home electric appliance, the operation information having been generated by that home electric appliance. In addition, the user needs to personally gather external information (for example, environmental information such as weather forecast) necessary to operate the individual home electric appliance.

Patent Literature 1, for example, discloses an electronic communication device that assists in electronic communication between a user and a personified agent by obtaining external, environmental information over a network, creating a message including information on the external environment, and outputting that message. This electronic communication device eliminates the need for the user to personally gather external information.

CITATION LIST

Patent Literature 1

Japanese Patent Application Publication, Tokukai, No. 2005-92540 A (Publication Date: Apr. 7, 2005)

SUMMARY OF INVENTION

Technical Problem

Even the use of the electronic communication device of Patent Literature 1, however, leaves the need for the user to personally gather information such as (i) sensor information generated by a sensor provided to an individual home electric appliance or the like and (ii) operation information on a home electric appliance, the operation information having been generated by that home electric appliance. Further, the electronic communication device of Patent Literature 1 offers no means for sharing information generated by sensors or external information among a plurality of users. The electronic communication device of Patent Literature 1 thus requires an individual user to personally (i) gather such pieces of information and (ii) share the information with others.

The present invention has been accomplished in view of the above problem. It is an object of the present invention to provide a message originating server, a message originating method, a terminal, an electric appliance control system, and an electric appliance each for originating a message to be directed to a user, the message corresponding to a combination of (I) at least either of (i) sensor information generated by a sensor provided inside the user's house and (ii) operation information on an electric appliance inside the house, the operation information having been generated by that electric appliance, and (II) external information.

In addition, the electronic communication device of Patent Literature 1 is arranged such that the user communicates with a virtual agent. Such communication with a virtual agent is, however, not familiar to the user and is thus not easily understandable.

The present invention, in view of the above problem, has another object to provide a message originating server, a message originating method, a terminal, an electric appliance control system, and an electric appliance each for originating a message in such a manner as to allow a user to feel as if it is a household electric appliance of the user's that is originating a message to be directed to the user.

Additional objects, features, and strengths of the present invention will be made clear by the description below. Further, the advantages of the present invention will be evident from the following explanation in reference to the drawings.

Solution to Problem

In order to solve the above problems, a message originating server of one aspect of the present invention is a message originating server for originating a message to be directed to a user, the message originating server including: an information obtaining section for obtaining (i) sensor information generated by a sensor provided inside a house of the user's and (ii) operation information on an electric appliance provided inside the house of the user's, the operation information having been generated by the electric appliance; an external information obtaining section for obtaining external information from outside; an analyzing section for analyzing (i) at least either of the sensor information and the operation information and (ii) the external information; a message generating section for generating a first message corresponding to a result of the information analysis by the analyzing section; and a first control section for originating the first message generated by the message generating section.

In order to solve the above problems, a message originating system of one aspect of the present invention is a message originating system including a message originating server for originating a message to be directed to a user, the message originating server including: an information obtaining section for obtaining (i) sensor information generated by a sensor provided inside a house of the user's and (ii) operation information on an electric appliance provided inside the house of the user's, the operation information having been generated by the electric appliance; an external information obtaining section for obtaining external information from outside; an analyzing section for analyzing (i)

at least either of the sensor information and the operation information and (ii) the external information; a message generating section for generating a message corresponding to a result of the information analysis by the analyzing section; and a control section for originating the message generated by the message generating section.

In order to solve the above problems, a message originating method of one aspect of the present invention is a message originating method for use by a message originating server for originating a message to be directed to a user, the message originating method including the steps of: (a) obtaining (i) sensor information generated by a sensor provided inside a house of the user's and (ii) operation information on an electric appliance provided inside the house of the user's, the operation information having been generated by the electric appliance; (b) obtaining external information from outside; (c) analyzing (i) at least either of the sensor information and the operation information and (ii) the external information; (d) generating a message corresponding to a result of the information analysis during the step (c); and (e) originating the message generated during the step (d).

In order to solve the above problems, a message originating server of one aspect of the present invention is a message originating server for originating a message to be directed to a user, the message originating server including: a message generating section for generating a message for the user; and a control section for (i) arranging the message in such a manner as to allow the user to feel as if an electric appliance inside a house of the user's is originating the message and (ii) originating the message.

In order to solve the above problems, a message originating system of one aspect of the present invention is a message originating system including a message originating server for originating a message to be directed to a user, the message originating server including: a message generating section for generating a message for the user; and a control section for originating the message in such a manner as to allow the user to feel as if an electric appliance inside a house of the user's is originating the message.

In order to solve the above problems, a message originating method of the one aspect of the present invention is a message originating method for use by a message originating server for originating a message to be directed to a user, the message originating method including the steps of: (a) generating a message for the user; and (b) originating the message in such a manner as to allow the user to feel as if an electric appliance inside a house of the user's is originating the message.

A terminal of one aspect of the present invention is a terminal for (i) posting a message onto an electric message board for use in communication between members of a group and for (ii) viewing the message posted on the electric message board, the terminal including: an input section at which a member of the group inputs a message to be posted onto the electric message board; and a display section for displaying the message, obtained from the electric message board, for any member of the group to view the message posted on the electric message board, the message displayed by the display section being arranged in such a manner as to allow the members to feel as if an electric appliance inside a house of the members' is originating the message.

An electric appliance control system of one aspect of the present invention is an electric appliance control system including: a message obtaining section for obtaining a message posted on an electric message board for use in communication between members of a group by a member of the group; an analyzing section for analyzing content of the message obtained by the message obtaining section; and a control section for, in a case where the message content analyzed by the analyzing section is an instruction to operate an electric appliance inside a house of the members', controlling operation of the electric appliance in accordance with the operation instruction.

An electric appliance of one aspect of the present invention is an electric appliance including: a loudspeaker, the electric appliance causing the loudspeaker to output a message in a form of a voice, the message being a message generated by a message generating section in correspondence with a result of analyzing operation of the electric appliance, the operation of the electric appliance being operation carried out in accordance with an operation instruction for the electric appliance, the operation instruction being included in a message posted on an electric message board for use in communication between members of a group, the electric appliance outputting the generated message from the loudspeaker in the form of a voice in accordance with an instruction from a control section for controlling the operation of the electric appliance.

Advantageous Effects of Invention

One aspect of the present invention allows a message to be originated to be directed to a user, the message corresponding to a combination of (I) at least either of (i) sensor information generated by a sensor provided inside the house and (ii) operation information on a home electric appliance, the operation information having been generated by that home electric appliance, and (II) external information. This arrangement eliminates the need for the user to personally gather (I) information such as (i) sensor information generated by a household sensor provided to an individual household electric appliance or the like and (ii) operation information on a household electric appliance, the operation information having been generated by that electric appliance, or (II) external information obtained through the Internet or the like.

One aspect of the present invention, by originating a message in such a manner as to allow a user to feel as if a household electric appliance of the user's is originating the message, allows the user to feel as if the user is communicating with the household electric appliance. This arrangement allows the user to feel more familiar with and thus easily understand a message originated by a message originating server of one aspect of the present invention.

BRIEF DESCRIPTION OF DRAWINGS

FIG. 1 is a block diagram illustrating a main configuration of a control server in a household electric appliance control system of one embodiment of the present invention.

FIG. 2 is a diagram illustrating first to fourth tables for use by a household electric appliance control system of one embodiment of the present invention.

Figure 6:
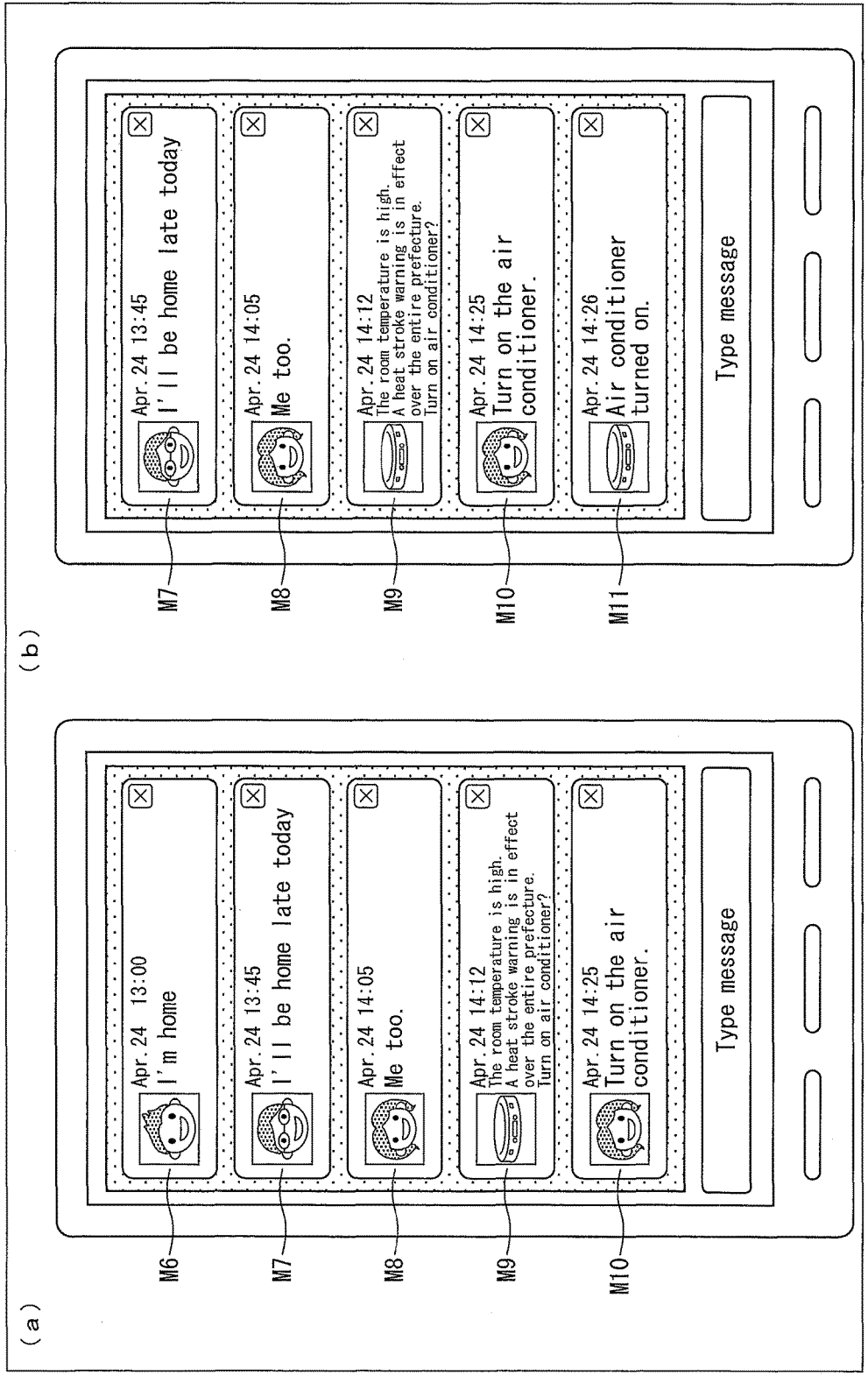

(a) and (b) of FIG. 6 are each a diagram illustrating an example screen displaying, in a timeline, messages posted on a family message board when a household electric appliance control system of one embodiment of the present invention controls the operation of a home electric appliance.

Figure 7:
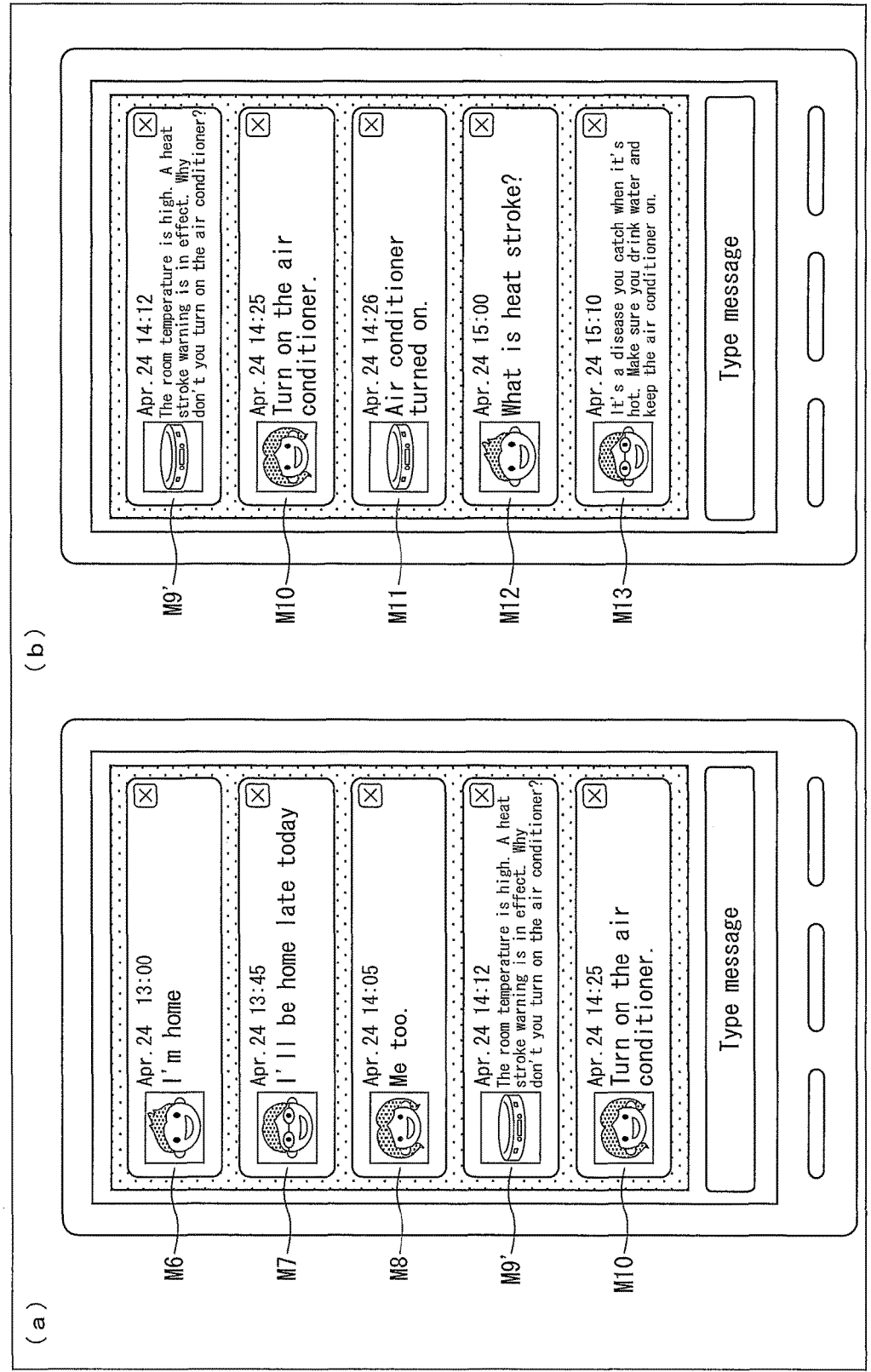

(a) and (b) of FIG. 7 are each a diagram illustrating an example screen displaying, in a timeline, messages posted on a family message board when a household electric appliance control system of one embodiment of the present invention controls the operation of a home electric appliance.

Figure 8:
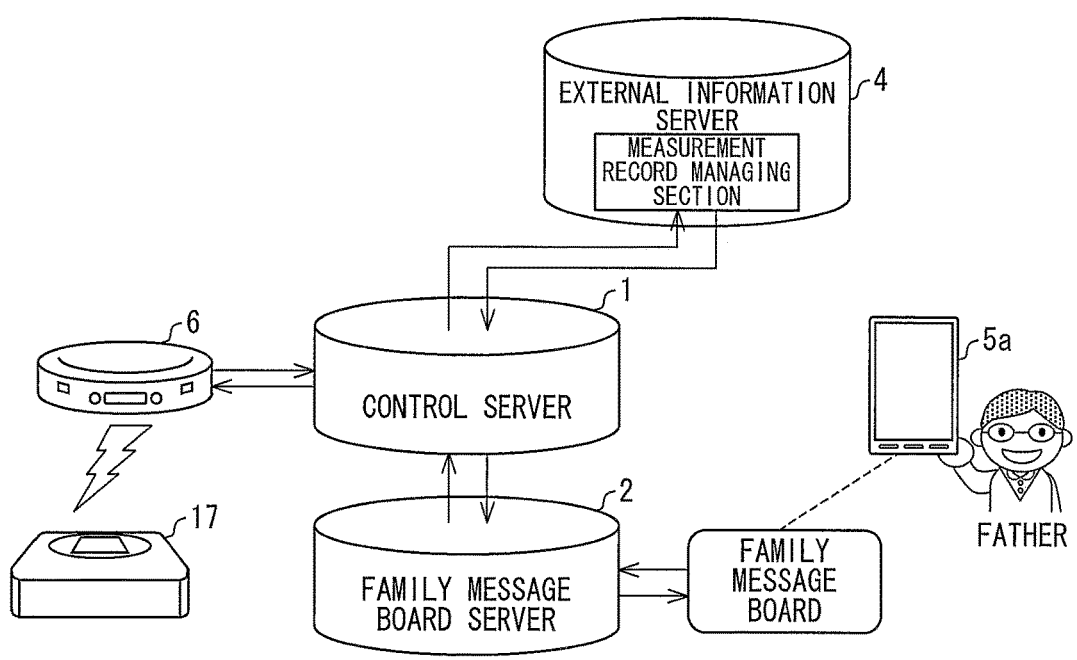

FIG. 8 is a diagram illustrating an outline of a household electric appliance control system of one embodiment of the present invention.

Figure 9:
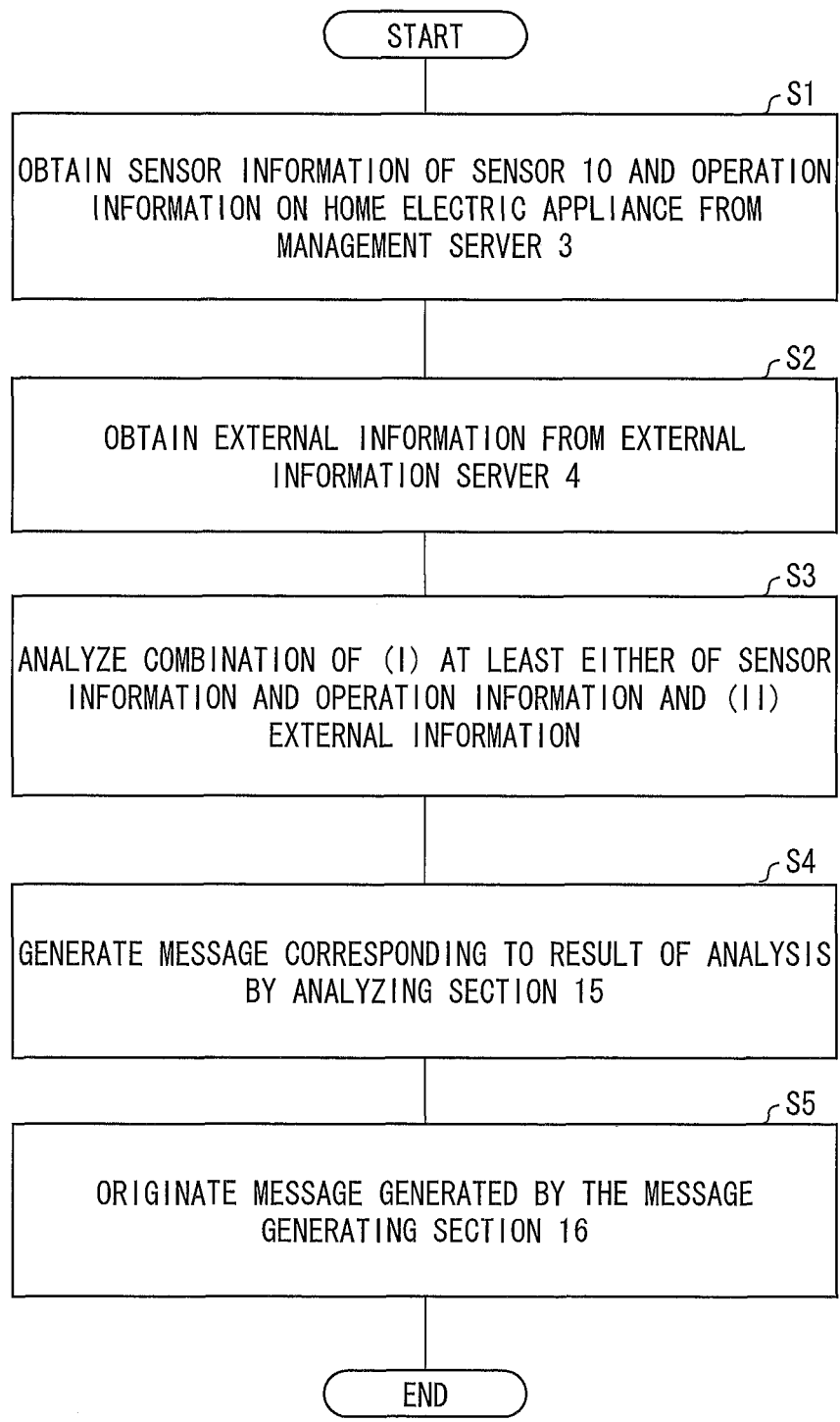

FIG. 9 is a flowchart illustrating a flow of a message originating process carried out by a control server of one embodiment of the present invention.

DESCRIPTION OF EMBODIMENTS (Outline of Household Electric Appliance Control System)

Figure 3:
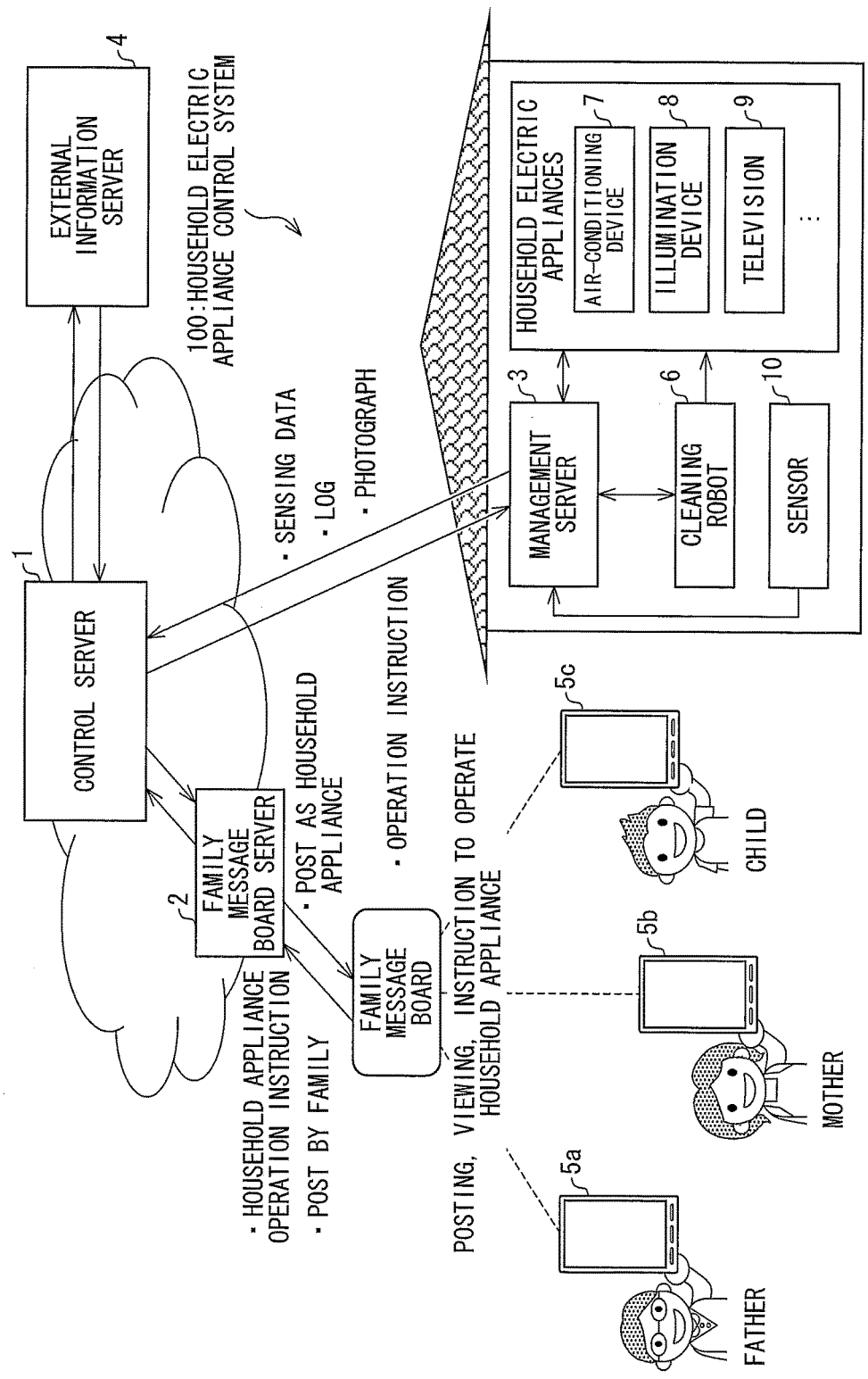
FIG. 3 is a diagram illustrating an outline of a household electric appliance control system of one embodiment of the present invention.

The description below outlines a household electric appliance control system of one embodiment of the present invention with reference to FIG. 3. FIG. 3 is a diagram illustrating an outline of a household electric appliance control system 100.

FIG. 3 shows the term "FAMILY MESSAGE BOARD", which refers in the present embodiment to a network service (electric message board) for use in information exchange between particular members (mainly family members and close relatives), the network service normally allowing participants to share with each other information on, for example, a small task or event.

The household electric appliance control system 100 provides information from outside the group of members registered for the family message board service. The household electric appliance control system 100 is arranged such that an electric appliance provided inside the house (hereinafter referred to as "home electric appliance") writes a post onto the family message board in correspondence with such information as (i) sensor information generated by a sensor 10 provided inside the house, (ii) external information, and/or (iii) a post written by a member. The household electric appliance control system 100 is further arranged to be capable of controlling the operation of a home electric appliance in accordance with an instruction entered by a member through the family message board.

The household electric appliance control system 100 includes, as illustrated in FIG. 3, a control server 1 (message originating server), a family message board server 2 (electric message board server), a management server 3, and an external information server 4. The family message board is arranged to allow members of a family (in the example of FIG. 3, the father, the mother, and a child) to (i) access the family message board with use of portable terminals 5a to 5c held by the respective members and thus (ii) post a message, view the family message board, and enter an instruction to operate a home electric appliance. The management server 3 is connected to a cleaning robot 6 via a wireless communication, and is connected to home electric appliances via a wired or wireless communication. FIG. 3 illustrates an example involving an air-conditioning device 7, an illumination device 8, and a television 9 as the home electric appliances. The home electric appliances and their number are, however, not particularly limited.

The control server 1 writes a post onto the family message board in correspondence with, for example, (i) sensor information generated by the sensor 10 provided inside the house, (ii) information on the operation of a home electric appliance, the information having been generated by that home electric appliance, (iii) external information, and (iv) a post written by a member. More specifically, the control server 1 writes a post as a character personifying the cleaning robot 6. This arrangement allows the members of the family to experience, on the family message board, a simulation of communicating with the cleaning robot 6. The control server 1 accepts an operation instruction from any of the portable terminals 5a to 5c and thus transmits, to the management server 3, an instruction for an operation corresponding to the operation instruction accepted. This arrangement allows the control server 1 to control the operation of the cleaning robot 6 or of a home electric appliance. The description of the present embodiment deals with an example in which the control server 1 has both (i) the function of writing a post onto the family message board and (ii) the function of controlling the respective operations of the cleaning robot 6 and of the home electric appliances. These functions may alternatively be included in respective separate servers.

The family message board server 2 carries out the overall processing related to the family message board, such as (i) causing the portable terminals 5a to 5c to present a screen displaying the family message board and (ii) managing posts. The management server 3 centrally controls transmission of information between (i) the cleaning robot 6 or home electric appliance and (ii) the control server 1. Specifically, the management server 3 transmits, to the control server 1, (i) information (obtained information or operation information) on the cleaning robot 6 and the home electric appliances and (ii) sensor information generated by the sensor 10 provided inside the house. The management server 3 further controls the operation of the cleaning robot 6 or home electric appliance in accordance with an operation instruction received from the control server 1. The external information server 4 is an external server such as an Internet server, and obtains various pieces of information from the outside. The control server 1 obtains necessary external information from the external information server 4, and posts the external information onto the family message board.

In the example of FIG. 3, the management server 3 transmits such information as sensor information generated by the sensor 10 provided inside the house. The information to be transmitted is, however, not limited to such example information. In the case where no central control is required, the household electric appliance control system 100 may be arranged such that the management server 3 is omitted and that the cleaning robot 6 transmits and receives information to and from the control server 1. Further, the example of FIG. 3 shows the management server 3 as being provided inside a house. The household electric appliance control system 100 may, however, be arranged such that the management server 3 is provided outside a house or inside the control server 1.

The portable terminals 5a to 5c are each a device for viewing the family message board, writing a post onto the family message board, and entering an instruction to operate the cleaning robot 6 and the home electric appliances. FIG. 3 illustrates an example in which the portable terminals 5a to 5c are smartphones. The portable terminals 5a to 5c are, however, not limited to smartphones as long as the portable terminals 5a to 5c each allow a user to view the family message board, write a post onto the family message board, and enter an operation instruction.

The cleaning robot 6 is a self-propelled cleaner that cleans the floor automatically. The cleaning robot 6 has, for example, a voice output function in addition to the cleaning function. The cleaning robot 6 further has the function of transmitting a control signal to a home electric appliance to operate it.

The air-conditioning device 7 carries out air conditioning such as cooling and heating, and is what is called an air conditioner. The air-conditioning device 7 includes a temperature sensor to detect a room temperature, and transmits information on the detected room temperature to the management server 3. The illumination device 8 includes a light source such as an LED, and is capable of switching the light source on and off under control of the management server 3. The television 9 is a television receiver, and is also capable of being operated under control of the management server 3. The sensor 10 provided inside the house may be mounted in the cleaning robot 6 or home electric appliance, or may be provided by itself inside the house.

(Arrangement of Control Server 1)

The description below deals with a detailed arrangement of the control server 1 of the household electric appliance control system 100 with reference to FIGS. 1 and 2. FIG. 1 is a block diagram illustrating a main configuration of the control server 1 in the household electric appliance control system 100. FIG. 2 is a diagram illustrating first to fourth tables for use by the household electric appliance control system 100.

The control server 1, as illustrated in FIG. 1, includes a communication section 11, an appliance information obtaining section 12 (information obtaining section), an external information obtaining section 13, a message obtaining section 14, an analyzing section 15, and a message generating section 16 (control section). The communication section 11 is a member for communication with an external device, and communicates with the family message board server 2, the management server 3, and the external information server 4 over a network.

The appliance information obtaining section 12 obtains, from the management server 3 through the communication section 11, (i) information (obtained information or operation information) on the cleaning robot 6 and the home electric appliances and (ii) sensor information generated by the sensor 10 provided inside the house. The obtained information refers to, for example, (i) information that the cleaning robot 6 and the home electric appliances have obtained from outside and (ii) information obtained from other devices. The operation information refers to, for example, information on various settings of the cleaning robot 6 or home electric appliance and on the current state of the cleaning robot 6 or home electric appliance. Such information includes information on (i) whether the power is on or off, (ii) a set temperature for an air conditioner, and (iii) a set volume for a television.

The external information obtaining section 13 obtains external information from the external information server 4 through the communication section 11. The external information refers to information obtained through the Internet or the like, and includes such information as a weather forecast, a television program guide, and a recipe. The external information obtaining section 13 is also capable of obtaining information on, for example, a schedule that a member has stored on the external information server 4.

The message obtaining section 14 obtains, from the family message board server 2 through the communication section 11, a message that a member has posted onto the family message board. The message refers to, for example, text, an image, and a voice recording.

The analyzing section 15 analyzes (i) information obtained by the appliance information obtaining section 12 and (ii) external information obtained by the external information obtaining section 13. Specifically, the analyzing section 15 analyzes (i) at least either of sensor information generated by the sensor 10 provided inside the house and operation information on a home electric appliance, the operation information having been generated by that home electric appliance, and (ii) external information. The analyzing section 15 includes, stored therein, a first table (described in detail later) associating an individual combination of (i) sensor information and/or operation information on a home electric appliance and (ii) external information with an analysis result corresponding to the combination (that is, an item such as a suggestion, recommendation, or proposal derived from the combination of the sensor information and/or operation information and the external information). The first table shown in (a) of FIG. 2 associates an individual combination of sensor information and external information with an analysis result corresponding to the combination. The first table is, however, not limited to such a table. The first table may alternatively associate, according to need, an individual combination of sensor information, operation information, and external information with an analysis result corresponding to the combination, or an individual combination of operation information and external information with an analysis result corresponding to the combination. The analyzing section 15 refers to the first table to derive an analysis result corresponding to a combination of (i) at least either of sensor information generated by the sensor 10 provided inside the house and operation information on a home electric appliance, the operation information having been generated by that home electric appliance, and (ii) external information. The analyzing section 15 further analyzes information obtained by the message obtaining section 14. Specifically, the analyzing section 15 analyzes the content of a message posted by a member. The analyzing section 15 includes, stored therein, a second table as shown in (b) of FIG. 2, the second table (described in detail later) associating information included in a message posted by a member (that is, a word/phrase or metadata included in the message) with an analysis result corresponding to the information (that is, the message content derived from the word/phrase or metadata included in the message). The analyzing section 15 refers to the second table to derive an analysis result corresponding to a message posted by a member.

The message generating section 16 creates a message corresponding to the result of analysis by the analyzing section 15. The message generating section 16 includes, stored therein, a third table as shown in (c) of FIG. 2, the third table (described in detail later) associating (i) an individual result (that is, a suggestion, recommendation, or proposal) of the analyzing section 15 analyzing the above information with reference to the first table with (ii) a message corresponding to the analysis result (that is, a message of the above suggestion, recommendation, or proposal). The message generating section 16 further includes, stored therein, a fourth table as shown in (d) of FIG. 2, the fourth table associating (i) an individual result (that is, the content of a message) of the analyzing section 15 analyzing the above content with reference to the second table with (ii) a message corresponding to the analysis result (that is, a response message that matches with the content). The message generating section 16 refers to the third table and the fourth table to derive a message corresponding to an analysis result.

The message generating section 16 sends its generated message to the family message board server 2 through the communication section 11. The family message board server 2 then posts the message onto the family message board. In the case where the analyzing section 15 has analyzed the content of a message posted by a member and has thus determined as a result that the message is of an instruction to operate the home electric appliance, the message generating section 16 sends the analysis result to the management server 3 through the communication section 11. The management server 3 then controls the operation of the cleaning robot 6 or home electric appliance in accordance with the operation instruction received from the control server 1.

(Outline of Family Message Board)

Figure 4:
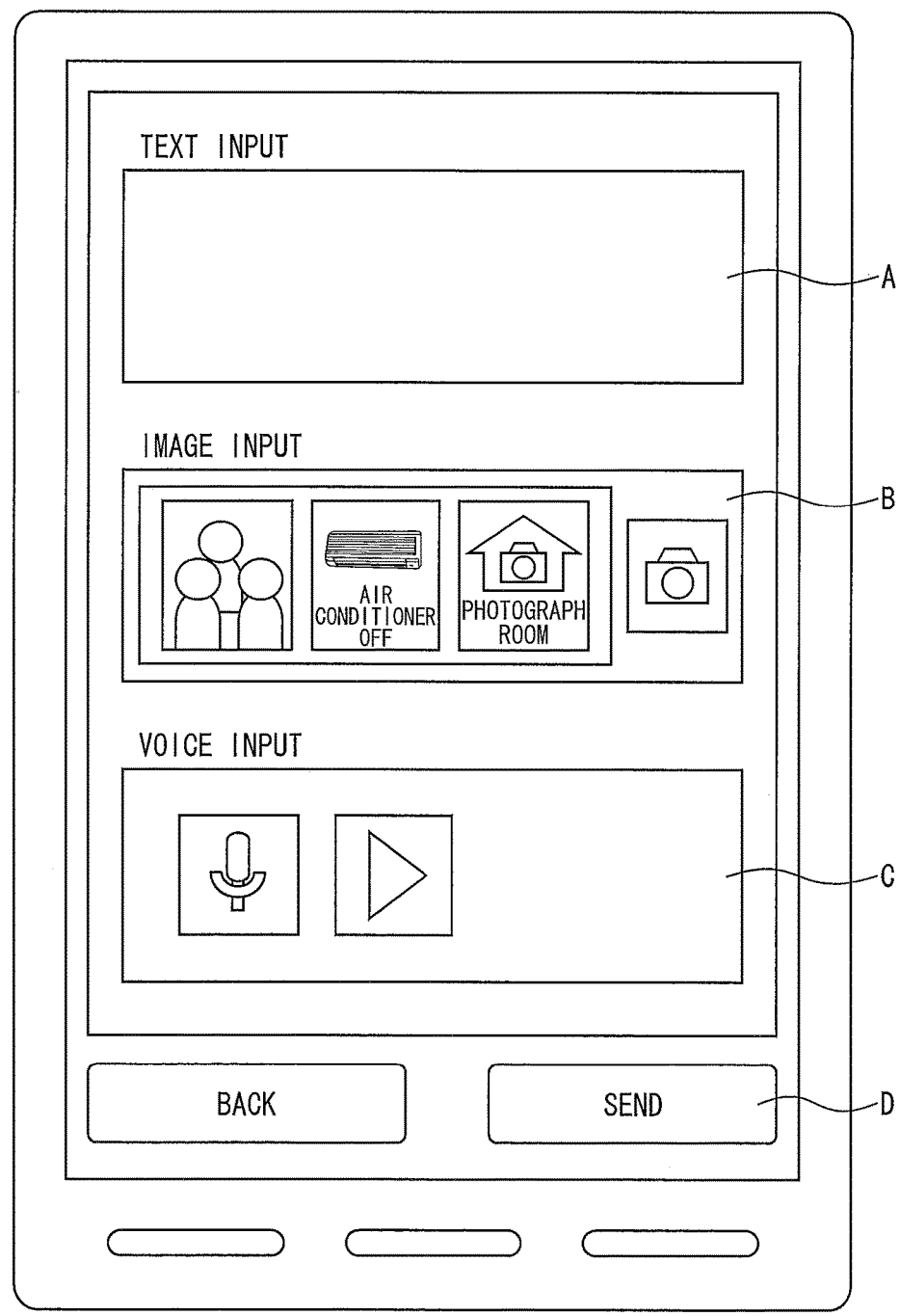
FIG. 4 is a diagram illustrating an example message input screen displayed on a portable terminal, held by a member, when the member posts a message onto a family message board.
Figure 5:
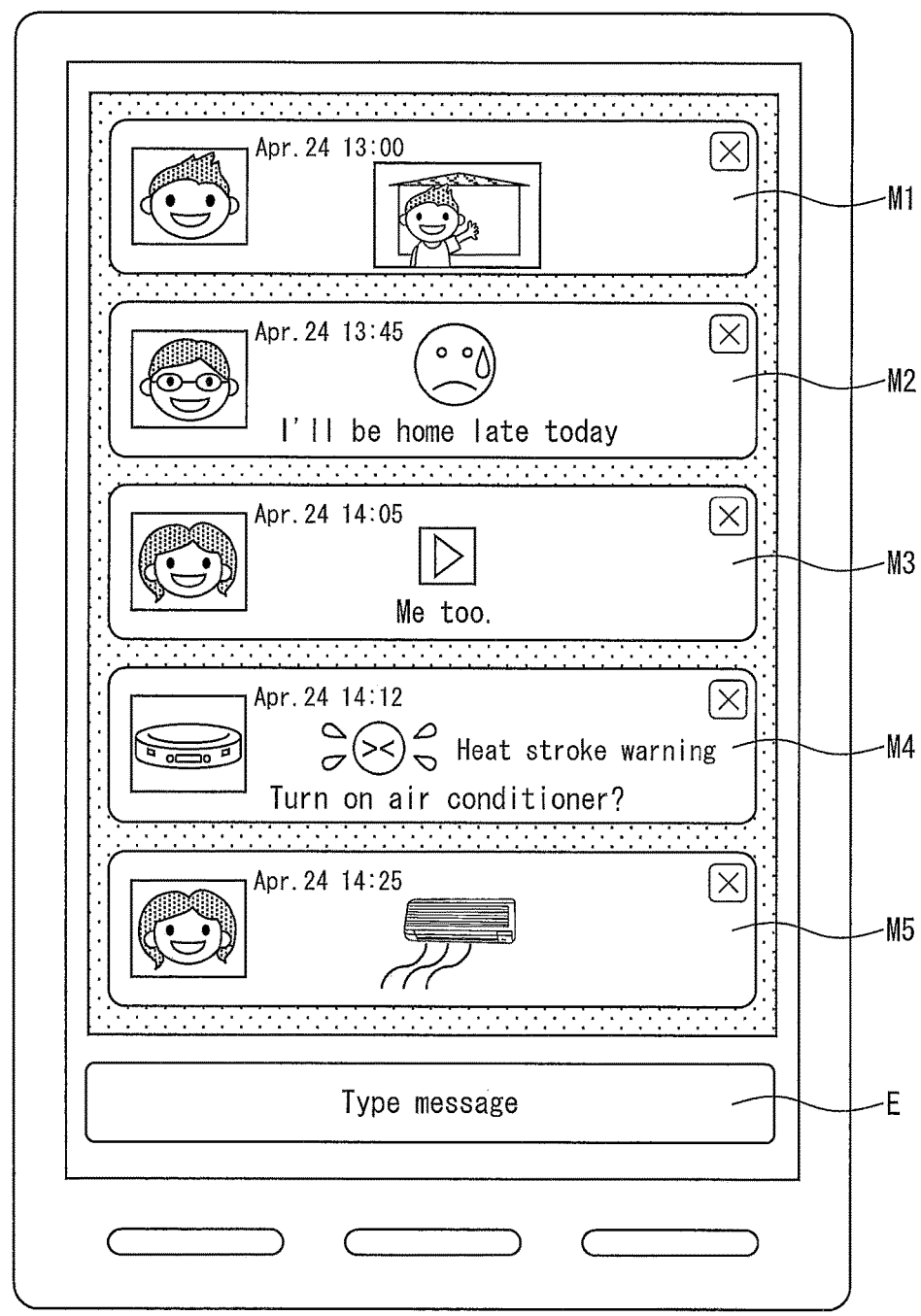
FIG. 5 is a diagram illustrating an example screen on a portable terminal, the screen displaying messages on a family message board in a timeline.

The description below outlines the family message board with reference to FIGS. 4 and 5, and then deals with how the control server 1 writes a post onto the family message board. FIG. 4 is a diagram illustrating an example message input screen displayed on the portable terminals 5a to 5c, which are held by the respective members, when the members post a message onto the family message board with use of their respective portable terminals 5a to 5c. The above message may include, for example, text, a still image or illustration, a voice recording, or a video image. The message including any of the above may further include metadata to allow the control server 1 to analyze the message easily. FIG. 5 is a diagram illustrating an example screen on the portable terminals 5a to 5c, the screen displaying messages M1 to M5 on the family message board in a timeline.

When the members post a message onto the family message board with use of their respective portable terminals 5a to 5c, the portable terminals 5a to 5c display a screen as illustrated in FIG. 4, through which screen the members can post a message onto the family message board. The members can post, onto the family message board with use of their respective portable terminals 5a to 5c, a message including at least one of a text input, an image input, and a voice input. The screen illustrated in FIG. 4 includes (i) a text input section A, in which the members input text, (ii) an image input section B, in which the members input an image, and (iii) a voice input section C, in which the members input a voice recording.

Specifically, tapping on the box of the text input section A causes a software keyboard to be displayed, which allows a member to input, in the box, text to be posted. Alternatively, tapping on the box may cause a text list (that is, a list of a plurality of text items) to be displayed, thus allowing a member to select, from the text list, text to be posted. The member can then press the "SEND" button D to post the inputted or selected text onto the family message board.

The image input section B shown in FIG. 4 displays (i) an image list (that is, a list of a plurality of image items; the three images on the left) and (ii) a "capture" button (that is, the remaining image on the right). The member can select, from the image list, an image to be posted. Alternatively, in the case where the image list does not include a desired image, the member may tap on the "capture" button to activate a camera of a corresponding one of the portable terminals 5a to 5c, and photograph, on the spot, an image to be posted. The member can then press the "SEND" button D to post the selected or photographed image onto the family message board.

The voice input section C shown in FIG. 4 displays a "record" button (that is, the image on the left) and a "play" button (that is, the image on the right). The member can tap on the "record" button to start a recording mode for recording a voice. The member can tap on the "play" button to reproduce a recorded voice to check whether the voice has been recorded as intended. The member can then press the "SEND" button D to post the voice recording onto the family message board.

Messages posted by the members onto the family message board are displayed, for example, in a timeline as illustrated in FIG. 5. The family message board arranges such posted messages chronologically (in order of posting) from top to bottom, and displays for each message an icon indicative of the message poster. The member can write a post onto the family message board as long as the member has provided an input to at least one of the text input section A, the image input section B, and the voice input section C. In FIG. 5, for instance, the messages M1 and M5 each include only an image, whereas the messages M2 and M4 each include both an image and text, and the message M3 includes both a voice recording and text. Pressing the "INPUT MESSAGE" button E (that is, the image at the bottom of the screen illustrated in FIG. 5) on this screen causes transition to the message input screen of FIG. 4 for a message input.

(Posting by Control Server: No. 1)

The household electric appliance control system 100 of the present embodiment is arranged such that the control server 1 writes a post onto the family message board in correspondence with, for example, (i) sensor information generated by the sensor 10 provided inside the house, (ii) operation information on a home electric appliance, the operation information having been generated by that home electric appliance, (iii) external information, and (iv) a post written by a member. Specifically, the control server 1 analyzes (i) at least either of sensor information generated by the sensor 10 provided inside the house and operation information generated by a home electric appliance and (ii) external information obtained from the external information server 4, and then posts, onto the family message board, a message corresponding to the result of the analysis. The following discusses this operation in greater detail: The appliance information obtaining section 12 of the control server 1 obtains, from the management server 3 through the communication section 11, (i) sensor information generated by the sensor 10 provided inside the house and (ii) operation information on a home electric appliance, the operation information having been generated by that home electric appliance. The external information obtaining section 13 obtains external information from the external information server 4 through the communication section 11. The analyzing section 15 then refers to the first table to analyze (i) the information obtained by the appliance information obtaining section 12 and (ii) the external information obtained by the external information obtaining section 13. The first table associates (I) an individual combination of (i) at least either of sensor information generated by the sensor 10 provided inside the house and operation information on a home electric appliance, the operation information having been generated by that home electric appliance, and (ii) external information with (II) an analysis result corresponding to the combination. The above analysis result refers to an item such as a suggestion, recommendation, or proposal derived from an individual combination of at least either of sensor information generated by the sensor 10 provided inside the house and operation information on a home electric appliance, the operation information having been generated by that home electric appliance, and external information. The above item refers to, for example, an operation recommended for a particular home electric appliance.

The control server 1, as described above, analyzes (i) a combination of at least either of sensor information and operation information and (ii) external information, and then posts, onto the family message board, a message corresponding to the result of the analysis. The first table thus simply needs to associate (I) an individual combination of (i) at least either of sensor information and operation information and (ii) external information with (II) an analysis result corresponding to the combination. The first table shown in (a) of FIG. 2, for example, associates an individual combination of sensor information and external information with an analysis result corresponding to the combination. Specifically, the first table shown in (a) of FIG. 2 associates (I) a combination of (i) the sensor information "room temperature at 30° C." obtained by a temperature sensor provided to an air conditioner or the like and (ii) the external information "heat stroke warning in effect over entire state" obtained by the external information obtaining section 13 with (II) the item "turn on air conditioner". The first table shown in (a) of FIG. 2 further associates (I) a combination of (i) the sensor information "room temperature at 27° C." obtained by a temperature sensor provided to an air conditioner or the like and (ii) the external information "high temperature forecast today at 26° C." obtained by the external information obtaining section 13 with (II) the item "turn off air conditioner". These associations are, however, mere examples.

The message generating section 16 refers to the third table to create a message corresponding to the result of analysis by the analyzing section 15. The third table of the present embodiment, as shown in (c) of FIG. 2, associates (i) an individual analysis result (that a suggestion, recommendation, or proposal) derived by the analyzing section 15 with reference to the first table with (ii) a message corresponding to the analysis result. The above message is of a suggestion, a recommendation, a proposal or the like, and serves to, for example, suggest an operation recommended for a particular home electric appliance. The third table in (c) of FIG. 2 associates (i) the item "turn on air conditioner" as a result of analysis by the analyzing section 15 with (ii) the message "Turn on air conditioner?". The third table in (c) of FIG. 2 further associates (i) the item "turn off air conditioner" as a result of analysis by the analyzing section 15 with (ii) the message "Turn off air conditioner?". These associations are, however, mere examples.

The message generating section 16 sends its generated message to the family message board server 2 through the communication section 11. The family message board server 2 then posts the message, received from the control server 1, onto the family message board.

The household electric appliance control system 100 of the present embodiment is arranged, as described above, such that the family message board server 2 posts, onto the family message board, a message corresponding to a combination of (i) at least either of sensor information generated by the sensor 10 provided inside the house and operation information on a home electric appliance, the operation information having been generated by that home electric appliance, and (ii) external information obtained from the external information server 4. This arrangement eliminates the need for a member personally gather (I) information such as (i) sensor information generated by the household sensor 10 provided to an individual home electric appliance or the like, and (ii) operation information on a home electric appliance, the operation information having been generated by that home electric appliance, and (II) external information obtained through the Internet or the like. Further, the household electric appliance control system 100 posts the above message onto an electric message board (family message board) for use in communication between members registered on a group. This arrangement allows a plurality of members to share sensor information, operation information, and external information with each other, thus eliminating the need for each member to personally gather the above pieces of information and perform an operation to share the above pieces of information with other members.

In particular, by posting onto the family message board a suggestion for an operation that is recommended for a particular home electric appliance on the basis of various pieces of sensor information generated by a sensor, operation information, and external information, a member can originate information on that suggestion to be directed to a plurality of other members at a time. Further, a member can post onto the family message board an instruction to operate a particular home electric appliance. This arrangement eliminates the need to inform other members of the instruction entered to operate that home electric appliance.

The control server 1, as described above, analyzes (i) a combination of at least either of sensor information and operation information and (ii) external information, and then posts, onto the family message board, a message corresponding to the result of the analysis. The control server 1 may thus post a message onto the family message board in further correspondence with the current operation information on a home electric appliance (no specific example is described herein). The control server 1 can, in correspondence with the current operation information on a home electric appliance, suggest not only turning an air conditioner on or off but also, for example, raising or lowering the set temperature for an air conditioner if it is on.

The text list in the text input section A and the image list in the image input section B each preferably include, in correspondence with a registered appliance and its operation state, items that are each suitable for an operation of that appliance. For instance, if an air conditioner is not registered, the image list in the image input section B of FIG. 4 does not need the "AIR CONDITIONER OFF" icon. Further, if an air conditioner is registered and is already off, the image list in the image input section B of FIG. 4 may include an "AIR CONDITIONER ON" icon instead of the "AIR CONDITIONER OFF" icon.

(Posting by Control Server: No. 2)

The control server 1 additionally posts, onto the family message board, a message (response message) corresponding to the content of a message posted by a member onto the family message board. The following discusses this operation in greater detail: In the case where the family message board server 2 has posted a message onto the family message board and a member has then posted a message onto the family message board, the message obtaining section 14 of the control server 1 obtains that message, posted by the member, from the family message board server 2 through the communication section 11. The analyzing section 15 refers to the second table to analyze the message posted by the member onto the family message board. The second table, as shown in (b) of FIG. 2, associates (i) an individual piece of information included in a message (for example, a word/phrase included in text, metadata included in an image, or a word/phrase included in a voice recording) with (ii) an analysis result corresponding to the information. This analysis result refers to the message content derived from the word/phrase or metadata included in the message. The message content is, for example, (i) whether the message is of an instruction to operate a home electric appliance and (ii) in the case where the message is of an operation instruction, the content of the instruction. The second table in (b) of FIG. 2 associates (i) the phrases "turn on" and "air conditioner" included in a message with (ii) an "instruction to turn on the air conditioner" as an operation instruction. The second table in (b) of FIG. 2 further associates (i) the phrases "turn off" and "air conditioner" included in a message with (ii) an "instruction to turn off the air conditioner" as an operation instruction. These associations are, however, mere examples.

The analyzing section 15 can obtain information in a message by a known method. In the case where a member has posted a text message, the analyzing section 15 analyzes the text by a known text analysis method to extract a word/phrase included in the message. In the case where a member has posted a voice message, the analyzing section 15 analyzes the voice recording by a known voice analysis method to extract a word/phrase included in the message. The present specification omits a detailed description of such methods. The household electric appliance control system 100 is arranged such that in the case where a member has posted an image message, the message obtaining section 14 of the control server 1 receives metadata provided to the image. The analyzing section 15 then analyzes the metadata. In the case where a member selects a text item from the text list in the text input section A to post a message, the text list may also include, in advance, a text item tagged with metadata. The household electric appliance control system 100 is arranged such that even in the above case, the message obtaining section 14 of the control server 1 receives metadata provided to the text item. The analyzing section 15 then analyzes the metadata.

Next, the message generating section 16 refers to the fourth table to create a message corresponding to the result of the analysis by the analyzing section 15. The fourth table of the present embodiment, as shown in (d) of FIG. 2, associates (i) an individual analysis result (that is, the message content) derived by the analyzing section 15 with reference to the second table with (ii) a message corresponding to the analysis result. The above message is a response message responding to the content of a message posted by a member, and serves to, for example, indicate completion of an operation recommended for a particular home electric appliance. The fourth table in (d) of FIG. 2 associates (i) the "instruction to turn on the air conditioner" as a result of analysis by the analyzing section 15 with (ii) the response message "Air conditioner turned on" to indicate that the air conditioner has been turned on. The fourth table in (d) of FIG. 2 further associates (i) the "instruction to turn off the air conditioner" as a result of analysis by the analyzing section 15 with (ii) the response message "Air conditioner turned off" to indicate that the air conditioner has been turned off. These associations are, however, mere examples.

The message generating section 16 sends its generated response message to the family message board server 2 through the communication section 11. The family message board server 2 then posts the message, received from the control server 1, onto the family message board.

The household electric appliance control system 100 of the present embodiment is, as described above, arranged to also post, onto the family message board, a response message corresponding to the content of a message posted by a member onto the family message board. This arrangement enables two-way communication between the household electric appliance control system 100 and the members.

(Personification of Cleaning Robot 6)

The control server 1 writes a post onto the family message board as a character personifying the cleaning robot 6. Specifically, the control server 1 originates a message as if that message, which the control server 1 has caused the family message board server 2 to post onto the family message board, has been posted by the cleaning robot 6. More specifically, the control server 1 accompanies the message with a symbol associated with the cleaning robot 6. For instance, the control server 1 causes the family message board server 2 to post onto the family message board a message accompanied by an icon representing the cleaning robot 6 as its symbol. This arrangement allows a member to feel as if the message has been posted by the cleaning robot 6. The above symbol includes not only an icon but also a display associated with a particular home electric appliance (in this example, the cleaning robot 6), the display being of, for example, a combination of a still image, a moving image, and a character. As described above, the control server 1 can cause the family message board server 2 to post a message to originate it as if it has been posted by the cleaning robot 6.

The control server 1 may cause the family message board server 2 to inform a member of a message in the form of a voice in addition to or instead of posting the message onto the family message board. In this case, the message generating section 16 of the control server 1 sends its generated message to the management server 3 through the communication section 11. The management server 3 then causes the cleaning robot 6 to output, with use of a loudspeaker thereof, the message received from the control server 1. This arrangement allows a member to feel as if the cleaning robot 6 is speaking. The cleaning robot 6 may output a message with use of a loudspeaker by reproducing audio data (for example, a WAV file or MP3 file) generated by the control server 1 and received therefrom. Alternatively, the household electric appliance control system 100 may be arranged such that the cleaning robot 6 includes voice message patterns stored therein in advance and that the control server 1 instructs the cleaning robot 6 to send out a particular voice message in correspondence with the result of the control server 1 analyzing various pieces of information.

The control server 1 can, as described above, originate a message in such a manner as to allow a member to feel as if the cleaning robot 6 has posted a message onto the family message board or as if the cleaning robot 6 is speaking. This arrangement in turn allows the member to feel as if the member is communicating with the cleaning robot 6. The above arrangement consequently allows the member to feel more familiar with and thus easily understand (i) a message that the family message board server 2 posts onto the family message board and (ii) a message that the management server 3 causes the cleaning robot 6 to output in the form of a voice.

In the case where the control server 1 posts, onto the family message board, a message corresponding to a combination of (I) at least either of (i) sensor information generated by a plurality of sensors 10 and (ii) operation information on a home electric appliance, the operation information having been generated by that home electric appliance, and (II) external information or in the case where the control server 1 causes such a message to be outputted in the form of a voice, a member will more easily understand the situation if the control server 1 allows the member to feel as if the message has been originated by the cleaning robot 6, which is an appliance other than the plurality of sensors or the plurality of home electric appliances provided with the respective sensors. Further, in the case where (i) the control server 1 analyzes sensor information generated by a sensor 10 mounted in the cleaning robot 6 and thus posts a message and/or (ii) the control server 1 analyzes operation information (indicating, for example, that the cleaning robot 6 is doing the cleaning or that a remote control mounted in the cleaning robot 6 has sent a control signal to another home electric appliance to operate that home electric appliance) on the cleaning robot 6 and thus posts a message, allowing a member to feel as if the cleaning robot 6 has posted a message allows the member to (i) feel more familiar with that message and thus to (ii) easily understand the situation. While the description above deals with an arrangement of personifying the cleaning robot 6, the household electric appliance control system 100 may alternatively personify any home electric appliance or article other than the cleaning robot 6.

(Member's Instruction to Operate Home Electric Appliance)

The household electric appliance control system 100 is arranged, as described above, such that the members of a family can (i) access a family message board with use of portable terminals 5a to 5c held by the respective members and (ii) enter an instruction to operate a home electric appliance. A member can enter an instruction to operate a home electric appliance on the family message board by the same method as the method by which a member posts a message onto the family message board. Specifically, the members enter an instruction to operate a home electric appliance on the message input screen of the portable terminals 5a to 5c in FIG. 4. The members may enter an operation instruction in the form of any of a text input, an image input, and a voice input. In the case where, for instance, a member is to post, onto the family message board, an operation instruction to turn on the air conditioner, the member can input (i) the text "Turn on the air conditioner", (ii) an image indicative of an operation instruction to turn on the air conditioner, or (iii) the voice recording "turn on the air conditioner". The above image indicative of an operation instruction to turn on the air conditioner refers to an image provided in advance with, as metadata, information on a command to turn on the air conditioner. Such images each indicative of an instruction to operate a home electric appliance are included in advance in the image list in the image input section B (in FIG. 4, the second and third images from the left). A member can select, from the image list, an image indicative of an instruction to operate a home electric appliance to enter the operation instruction. The message M5 in FIG. 5, for example, includes an image indicative of an operation instruction to turn on the air conditioner.

The control server 1 obtains, from the family message board server 2, a message posted by a member onto the family message board, and analyzes the message. Specifically, the message obtaining section 14 obtains the message, posted by the member, from the family message board server 2 through the communication section 11. The analyzing section 15 refers to the second table to analyze the message posted by the member onto the family message board. In this case, the second table, as shown in (b) of FIG. 2, associates (i) an individual piece of information included in a message (for example, a word/phrase included in text, command information included in an image, or a word/phrase included in a voice recording) with (ii) an analysis result corresponding to the information. This analysis result refers to (i) whether the message is of an instruction to operate a home electric appliance and (ii) in the case where the message is of an operation instruction, the content of the instruction.

In the case where the analyzing section 15 has analyzed a message posted by a member and has thus determined as a result that the message is of an instruction to operate a home electric appliance, the message generating section 16 sends the analysis result to the management server 3 through the communication section 11. The management server 3 then controls the operation of the home electric appliance in accordance with the operation instruction received from the control server 1.

According to the above arrangement, the management server 3 controls the operation of a home electric appliance in accordance with an operation instruction received from the control server 1. The present embodiment is, however, not necessarily limited to such an arrangement. The present embodiment may alternatively be arranged, for instance, such that the management server 3, in accordance with an operation instruction received from the control server 1, causes the cleaning robot 6 to transmit a control signal to a home electric appliance to control its operation. In this case, the cleaning robot 6 transmits a control signal to a home electric appliance by a method in which, for instance, the cleaning robot 6 functions as a remote controller to transmit an infrared control signal.

The description above has cited specific examples of items associated in the second table. The items associated in the second table are, however, not necessarily limited to such specific examples, and may simply be selected as appropriate by a manager of the household electric appliance control system 100.

(Implementation Example of Household Electric Appliance Control No. 1)

The description below deals with a specific example of how the household electric appliance control system 100 controls the operation of a home electric appliance. The implementation example below is, however, a mere example: The household electric appliance control system 100 of the present invention is not limited to only that described in the implementation example below.

(a) and (b) of FIG. 6 are each a diagram illustrating an example screen displaying, in a timeline, messages M6 to M11 posted on a family message board when the household electric appliance control system 100 controls the operation of a home electric appliance. (a) of FIG. 6 illustrates a family message board for communication between members registered on a group. The first three messages M6 to M8 are a common message exchange between family members on a family message board.

The house of the family is equipped with an air conditioner provided with a temperature sensor. The appliance information obtaining section 12 of the control server 1 obtains information on the current room temperature from the temperature sensor, which is provided to the air conditioner, through the management server 3. Further, the external information obtaining section 13 obtains, from the external information server 4, information of a weather forecast (for example, information on an air-temperature change) for that day. The analyzing section 15 then refers to the first table to analyze (i) the information from the temperature sensor provided to the air conditioner and (ii) the information obtained from the external information server 4. The description below assumes that the current room temperature is high and that a heat stroke warning is in effect over the entire state. In the present implementation example, the first table associates (I) a combination of (i) the information "current room temperature is high" from a sensor and (ii) the external information "heat stroke warning in effect over entire state" with (II) the analysis result "decrease room temperature" (that is, turn on air conditioner). The analyzing section 15 thus derives the analysis result "decrease room temperature" (that is, turn on air conditioner), and sends the analysis result to the message generating section 16.

The message generating section 16 refers to the third table to create a message corresponding to the analysis result "decrease room temperature" (that is, turn on air conditioner). In the present implementation example, the third table associates the analysis result "decrease room temperature" (that is, turn on air conditioner) with the message "The room temperature is high. A heat stroke warning is in effect over the entire state. Turn on the air conditioner?". The message generating section 16 thus generates the message "The room temperature is high. A heat stroke warning is in effect over the entire state. Turn on the air conditioner?", and sends the message to the family message board server 2 through the communication section 11.

The family message board server 2 then posts, onto the family message board, the message received from the control server 1, that is, the message M9 "The room temperature is high. A heat stroke warning is in effect over the entire state. Turn on the air conditioner?".

Next, a member reads the message M9 posted on the family message board. The member determines whether to turn on the air conditioner, and posts onto the family message board a message corresponding to the determination. In (a) of FIG. 6, a member has posted onto the family message board the message M10 of an operation instruction to turn on the air conditioner. The message obtaining section 14 of the control server 1 obtains the message M10, posted by the member, through the family message board server 2. The analyzing section 15 then refers to the second table to analyze the message M10. In the present implementation example, the second table associates (i) the combination of the phrases "turn on" and "air conditioner" with (ii) an operation instruction to "turn on the air conditioner". The analyzing section 15 thus derives the operation instruction "turn on the air conditioner", and sends the operation instruction to the management server 3 through the communication section 11.

The management server 3 controls the operation of the home electric appliance in accordance with the operation instruction received from the control server 1. The analyzing section 15 then sends an operation instruction to the message generating section 16. The message generating section 16 refers to the fourth table to create a response message corresponding to the operation instruction "turn on the air conditioner". In the present implementation example, the fourth table associates (i) the operation instruction "turn on the air conditioner" with (ii) the response message "Air conditioner turned on". The message generating section 16 thus generates the response message "Air conditioner turned on", and sends the response message to the family message board server 2 through the communication section 11.

The family message board server 2, as illustrated in (b) of FIG. 6, then posts, onto the family message board, the response message received from the control server 1, that is, the message M11 "Air conditioner turned on".

As described above, the family message board server 2 posts, onto the family message board, a message corresponding to (i) sensor information generated by the temperature sensor provided to the air conditioner and (ii) information of a weather forecast obtained from the external information server 4. This eliminates the need for a member to personally gather (i) information on the current room temperature and (ii) information of a weather forecast through the Internet or the like.

FIG. 6 illustrates a mere example message that the household electric appliance control system 100 causes the family message board server 2 to post onto the family message board. Messages posted by the family message board server 2 are thus not necessarily limited to such a message. The household electric appliance control system 100 may alternatively cause the family message board server 2 to post, for example, a message as illustrated in FIG. 7. (a) and (b) of FIG. 7 are each a diagram illustrating an example screen displaying, in a timeline, messages M6 to M13 posted on a family message board when the household electric appliance control system 100 controls the operation of a home electric appliance.

In (a) of FIG. 7, the control server 1 has caused the family message board server 2 to post onto the family message board the message M9' "The room temperature is high. A heat stroke warning is in effect over the entire state. Why don't you turn on the air conditioner?". Causing the family message board server 2 to post onto the family message board a colloquial message (with a spoken expression) as above allows a member to (i) feel more familiar with that message and thus to (ii) easily understand it.

The household electric appliance control system 100 can use, for an icon to accompany a message that the control server 1 causes the family message board server 2 to post onto the family message board, an icon representing the cleaning robot 6 as a symbol associated with the cleaning robot 6. This arrangement allows a member to feel as if the message has been posted by the cleaning robot 6.

The household electric appliance control system 100 can additionally cause the management server 3 to cause the cleaning robot 6 to output, with use of a loudspeaker thereof, a message (for example, a message that prompts the father to weigh himself) that the control server 1 causes the family message board server 2 to post onto the family message board. This arrangement allows a member to feel as if the cleaning robot 6 is speaking.

Further, the two messages M12 and M13 in (b) of FIG. 7 indicate an exchange through which (i) a member who has read the message M9' asks a question about a point unknown to the member and (ii) another member answers the question. In the case where a message exchange on the family message board includes, for example, a point unknown to a member or a point difficult for a member to understand, the member can easily ask a question of another member on the spot as above. The household electric appliance control system 100 can thus provide a further communication started from the above messages M12 and M13 and centered around, for example, such a point unknown to a member or a point difficult for a member to understand. The household electric appliance control system 100, as a result, contributes to topic provision and smooth communication.

The description above has cited specific examples of items associated in the first to fourth tables. The items associated in the first to fourth tables are, however, not necessarily limited to such specific examples, and may simply be selected as appropriate by a manager of the household electric appliance control system 100.

(Implementation Example of Household Electric Appliance Control: No. 2)

The description below deals with another specific example of how the household electric appliance control system 100 controls the operation of a home electric appliance. The implementation example below is, however, a mere example: The household electric appliance control system 100 of the present invention is not limited to only that described in the implementation example below.

FIG. 8 is a diagram illustrating an outline of a household electric appliance control system 100. The household electric appliance control system 100 illustrated in FIG. 8 is arranged to (i) not include a management server 3 and to (ii) include a cleaning robot 6 that transmits and receives information to and from the control server 1.

FIG. 8 illustrates a body composition meter 17 and a cleaning robot 6 that are connected to each other with use of a wireless communication system based on Bluetooth (registered trademark) or the like. A member weighs himself/ herself with use of the body composition meter 17 to obtain measurement data on the body-weight measurement. The body composition meter 17 transmits the measurement data to the cleaning robot 6, which then transmits it to the external information server 4. The external information server 4 includes a measurement record managing section, which keeps a record of measurement data from the body composition meter 17. Further, the body composition meter 17 is provided with a sensor for detecting whether the body composition meter 17 has been operated. The sensor generates sensor information, and the body composition meter 17 transmits it to the cleaning robot 6, which then transmits it to the control server 1. The body composition meter 17 may transmit measurement data to the external information server 4 either through the control server 1 or not through the control server 1.

The description below assumes a case in which the father, who is a family member, weighs himself with use of the body composition meter 17 at around 8 p.m. every day to compare his body weight with a preset target value for the body weight. The measurement record managing section of the external information server 4, in this case, stores a schedule including the father's planned routine to weigh himself with use of the body composition meter 17 at around 8 p.m. every day to compare his body weight with a preset target value for the body weight.

The description below deals with how the household electric appliance control system 10 controls the operation of a home electric appliance in the case where the father forgets to weigh himself with use of the body composition meter 17. In the case where the father forgets to weigh himself with use of the body composition meter 17, the appliance information obtaining section 12 of the control server 1 obtains, from the sensor of the body composition meter 17 through the management server 3, information indicating that the body composition meter 17 has not been operated. Further, the external information obtaining section 13 obtains the schedule from the measurement record managing section of the external information server 4. The analyzing section 15 then refers to the first table to analyze (i) the information from the sensor provided to the body composition meter 17 and (ii) the information obtained from the external information server 4. In the present implementation example, the first table associates (I) a combination of (i) the information "body composition meter has not been operated" from the sensor and (ii) the external information "weigh himself with body composition meter at around 8 p.m. every day" with (II) the analysis result "has not weighed himself". The analyzing section 15 thus derives the analysis result "has not weighed himself", and sends the analysis result to the message generating section 16.

The message generating section 16 refers to the third table to create a message corresponding to the analysis result "has not weighed himself". In the present implementation example, the third table associates the analysis result "has not weighed himself" with the message "Dad, don't forget to weigh yourself". The message generating section 16 thus generates the message "Dad, don't forget to weigh yourself", and sends the message to the family message board server 2 through the communication section 11.

The family message board server 2 posts onto the family message board the message received from the control server 1, that is, the message "Dad, don't forget to weigh yourself".

As described above, even in the case where the father forgets to weigh himself with use of the body composition meter 17, the household electric appliance control system 100 posts, in correspondence with (i) information obtained from the sensor provided to the body composition meter 17 and (ii) a schedule obtained from the external information server 4, a message that prompts the father to weigh himself. This arrangement can prevent the father from forgetting to weigh himself.

The household electric appliance control system 100 can use, for an icon to accompany a message that the control server 1 causes the family message board server 2 to post onto the family message board, an icon representing the cleaning robot 6 as a symbol associated with the cleaning robot 6. This arrangement allows a member to feel as if the message has been posted by the cleaning robot 6.

The household electric appliance control system 100 can additionally cause the management server 3 to cause the cleaning robot 6 to output, with use of a loudspeaker thereof, a message that the control server 1 causes the family message board server 2 to post onto the family message board. This arrangement allows a member to feel as if the cleaning robot 6 is speaking.

The description below now deals with how the household electric appliance control system 10 controls the operation of a home electric appliance in the case where the father has weighed himself with use of the body composition meter 17. In the case where the father has weighed himself with use of the body composition meter 17, the body composition meter 17 transmits the father's measurement data to the external information server 4 through the cleaning robot 6. The appliance information obtaining section 12 of the control server 1 obtains, from the sensor of the body composition meter 17, through the management server 3, information indicating that the body composition meter 17 has been operated. Further, the external information obtaining section 13 obtains a schedule and a measurement record from the measurement record managing section of the external information server 4. The analyzing section 15 then refers to the first table to analyze (i) the information from the sensor provided to the body composition meter 17 and (ii) the information obtained from the external information server 4. In the present implementation example, the first table associates (I) a combination of (i) the information "body composition meter has been operated" from the sensor and (ii) the external information "measurement record" and "target body-weight value" with (II) an analysis result related to progress toward the target value such as "little more to target value". The analyzing section 15 thus derives the analysis result "little more to target value", and sends the analysis result to the message generating section 16.

The message generating section 16 refers to the third table to create a message corresponding to the analysis result "little more to target value". In the present implementation example, the third table associates the analysis result "little more to target value" with the message "A little more to reach the target!". The message generating section 16 thus generates the message "A little more to reach the target!", and sends the message to the family message board server 2 through the communication section 11.

The family message board server 2 posts onto the family message board the message received from the control server 1, that is, the message "A little more to reach the target!".

As described above, even in the case where the father has weighed himself with use of the body composition meter 17, the household electric appliance control system 100 posts, in correspondence with (i) information obtained from the sensor provided to the body composition meter 17 and (ii) a schedule and measurement record obtained from the external information server 4, a message that indicates progress toward a target value. This arrangement allows the father to learn about progress toward the target body weight, and can thus increase the father's motivation.

The household electric appliance control system 100 can use, for an icon to accompany a message that the control server 1 causes the family message board server 2 to post onto the family message board, an icon representing the cleaning robot 6 as a symbol associated with the cleaning robot 6. This arrangement allows a member to feel as if the message has been posted by the cleaning robot 6.

The household electric appliance control system 100 can additionally cause the management server 3 to cause the cleaning robot 6 to output, with use of a loudspeaker thereof, a message (that is, a message that prompts the father to weigh himself) that the control server 1 causes the family message board server 2 to post onto the family message board. This arrangement allows a member to feel as if the cleaning robot 6 itself is speaking.

The description above has cited specific examples of items associated in the first and third tables. The items associated in the first and third tables are, however, not necessarily limited to such specific examples, and may simply be selected as appropriate by a manager of the household electric appliance control system 100.

(Other Examples of Household Electric Appliance Control)

The description below deals with other examples of how the household electric appliance control system 100 controls the operation of a home electronic appliance. First, the household electric appliance control system 100 may, on the basis of (i) information such as room-temperature information and humidity information and (ii) information on the time of a member's expected homecoming, photograph the inside of a room with use of a room camera or turn on an air conditioner. In this case, the control server 1 analyzes (I) information such as (i) room-temperature information generated by a temperature sensor provided to the air conditioner and (ii) humidity information generated by a humidity sensor provided to the air conditioner and (II) a schedule (including information on the time of a member's expected homecoming) obtained from the external information server 4. The control server 1 thus causes the family message board server 2 to post, onto the family message board, a message that suggests photographing the inside of the room with use of the room camera or turning on the air conditioner. The control server 1 then, in accordance with a member's operation instruction, causes the management server 3 to photograph the inside of the room with use of the room camera or turn on the air conditioner.

The household electric appliance control system 100 may, on the basis of (i) humidity information and (ii) information of a weather forecast (for example, information on an air-temperature change) for that day, cause the washing machine to perform a washing operation until it finishes spin-drying the laundry or until it finishes heat-drying the laundry. In this case, the control server 1 analyzes (i) humidity information generated by a humidity sensor provided inside the room and (ii) information of a weather forecast obtained from the external information server 4, and thus causes the family message board server 2 to post, onto the family message board, a message that suggests causing the washing machine to perform a washing operation until it finishes spin-drying the laundry or until it finishes heat-drying the laundry. The control server 1, in accordance with a member's operation instruction, causes the management server 3 to cause the washing machine to perform a washing operation until it finishes spin-drying the laundry or until it finishes heat-drying the laundry.

The household electric appliance control system 100 may, on the basis of (i) information on foodstuffs kept in a refrigerator and (ii) calendar information, suggest a best suited dish and recipe and set an electronic cooker for that recipe. In this case, the control server 1 analyzes (i) information on foodstuffs kept in a refrigerator and (ii) calendar information obtained from the external information server 4, and thus causes the family message board server 2 to post, onto the family message board, a message that suggests a best suited dish and recipe and that suggests setting an electronic cooker for that recipe. The control server 1, in accordance with a member's operation instruction, causes the management server 3 to set the electronic cooker for the above recipe. Information on foodstuffs kept in a refrigerator may be stored in (i) a memory provided to the refrigerator or in (ii) a memory provided outside the refrigerator. To store such information in a memory, a member can manually enter data, that is, (i) information on foodstuffs that the member has put in the refrigerator and (ii) information on foodstuffs that the member has taken out of the refrigerator, each time the member puts foodstuffs in the refrigerator or takes foodstuffs out of the refrigerator. Alternatively, a member may manage data, that is, (i) information on foodstuffs that the member has put in the refrigerator and (ii) information on foodstuffs that the member has taken out of the refrigerator, by attaching a bar code to each foodstuff and bringing such bar codes close to a scanner each time the member puts foodstuffs in the refrigerator or takes foodstuffs out of the refrigerator.

(Message Originating Process by Control Server)

The description below outlines a message originating process carried out by the control server 1 of the household electric appliance control system 100 of the present embodiment. FIG. 9 is a flowchart illustrating a flow of a message originating process carried out by the control server 1.

First, the appliance information obtaining section 12 of the control server 1 obtains, from the management server 3 through the communication section 11, (i) sensor information generated by a sensor 10 provided inside the house and (ii) operation information on a home electric appliance, the operation information having been generated by that home electric appliance (step S1; hereinafter abbreviated to "S1"). The external information obtaining section 13 obtains external information from the external information server 4 through the communication section 11 (S2). The analyzing section 15 analyzes (i) the information obtained by the appliance information obtaining section 12 and (ii) the external information obtained by the external information obtaining section 13 (S3).

The message generating section 16 creates a message corresponding to the result of the analysis by the analyzing section 15 (S4). The control server 1 originates the message, generated by the message generating section 16, through the communication section 11 (S5). The control server 1 originates such a message by a specific method of, as described above, (i) causing the family message board server 2 to post a message onto the family message board or (ii) causing the management server 3 to cause a home electric appliance to output a message in the form of a voice. The control server 1 carries out a message originating process with the above step flow.

[Software Implementation Example]

The control blocks of the control server 1 (in particular, the analyzing section 15 and the message generating section 16) may each be in the form of (i) a logic circuit (hardware) on an integrated circuit (IC chip) or the like or (ii) software with use of a CPU (central processing unit).

In the latter case, the control server 1 includes (i) a CPU for executing instructions from a program, that is, software for performing a function, (ii) a ROM (read only memory) or memory device (hereinafter these are each referred to as "recording medium") storing programs and various data in a computer- (or CPU-) readable manner, and (iii) a RAM (random access memory) to which programs are loaded. A computer (or CPU) reads the programs from the recording medium to execute the programs, which achieves the above object of the present invention. The above recording medium is a non-transitory, tangible medium such as a tape, a disc, a card, a semiconductor memory, and a programmable logic circuit. The programs may be supplied to the computer through any transmission medium (for example, a communication network or broadcast wave) through which the programs can be transmitted. The present invention may further be in the form of a data signal embedded in a carrier wave and embodied by electronic transmission of the programs.

The present invention is not limited by the description of the embodiment above, but may be altered in various manners within the scope of the claims. Any embodiment based on a proper combination of technical means achieved by appropriate modifications within the scope of the claims is also encompassed in the technical scope of the present invention.

[Recap]

A message originating server of one aspect of the present invention is a message originating server for originating a message to be directed to a user, the message originating server including: an information obtaining section for obtaining (i) sensor information generated by a sensor provided inside a house of the user's and (ii) operation information on an electric appliance provided inside the house of the user's, the operation information having been generated by the electric appliance; an external information obtaining section for obtaining external information from outside; an analyzing section for analyzing (i) at least either of the sensor information and the operation information and (ii) the external information; a message generating section for generating a first message corresponding to a result of the information analysis by the analyzing section; and a first control section for originating the first message generated by the message generating section.

A message originating system of one aspect of the present invention is a message originating system including a message originating server for originating a message to be directed to a user, the message originating server including: an information obtaining section for obtaining (i) sensor information generated by a sensor provided inside a house of the user's and (ii) operation information on an electric appliance provided inside the house of the user's, the operation information having been generated by the electric appliance; an external information obtaining section for obtaining external information from outside; an analyzing section for analyzing (i) at least either of the sensor information and the operation information and (ii) the external information; a message generating section for generating a message corresponding to a result of the information analysis by the analyzing section; and a control section for originating the message generated by the message generating section.

A message originating method of one aspect of the present invention is a message originating method for use by a message originating server for originating a message to be directed to a user, the message originating method including the steps of: (a) obtaining (i) sensor information generated by a sensor provided inside a house of the user's and (ii) operation information on an electric appliance provided inside the house of the user's, the operation information having been generated by the electric appliance; (b) obtaining external information from outside; (c) analyzing (i) at least either of the sensor information and the operation information and (ii) the external information; (d) generating a message corresponding to a result of the information analysis during the step (c); and (e) originating the message generated during the step (d).

The above arrangements each allow a message to be originated to be directed to a user, the message corresponding to a combination of (I) at least either of (i) sensor information generated by a sensor provided inside the house and (ii) operation information on a household electric appliance, the operation information having been generated by that electric appliance, and (II) external information. The above arrangements thus each eliminate the need for the user to personally gather (I) information such as (i) sensor information generated by a household sensor provided to an individual household electric appliance or the like and (ii) operation information on a household electric appliance, the operation information having been generated by that electric appliance, or (II) external information obtained through the Internet or the like.

The message originating server of one aspect of the present invention may be arranged such that the first control section causes an electric message board server, which manages posting of a message onto an electric message board for use in communication between members of a group including the user, to post the first message generated by the message generating section.

The above arrangement allows the message to be posted onto an electric message board for use in communication between members of a group. The above arrangement thus allows a plurality of members to share with each other information such as sensor information generated by sensors and external information, thereby eliminating the need for each member to personally gather the above pieces of information and perform an operation to share the above pieces of information with other members.

The message originating server of one aspect of the present invention may further include: a message obtaining section for obtaining a second message posted by a member of the group onto the electric message board, wherein: the analyzing section further analyzes content of the second message obtained by the message obtaining section; the message generating section further generates a response message corresponding to a result of the analysis of the message content by the analyzing section; and the first control section originates the response message generated by the message generating section.

The above arrangement allows the message originating server of one aspect of the present invention to also originate a message corresponding to the content of a message posted by a member onto the electric message board. The above arrangement thus enables two-way communication between the message originating server and a member.

The message originating server of one aspect of the present invention may be arranged such that the result of the information analysis indicates an operation recommended for an electric appliance inside the house of the members'; and the first message generated by the message generating section is a message that suggests the operation.

With the above arrangement, by posting onto the electric message board a suggestion for an operation that is recommended for a particular household electric appliance on the basis of (i) various pieces of sensor information generated by a sensor, (ii) operation information on an electric appliance, the operation information having been generated by that electric appliance, and (iii) external information, a member can originate the suggestion to be directed to a plurality of other members at a time.

The message originating server of one aspect of the present invention may be arranged such that the result of the information analysis indicates an operation recommended for an electric appliance inside the house of the members'; the first message generated by the message generating section is a message that suggests the operation; the content of the second message posted by the member is an instruction to operate the electric appliance inside the house of the members'; the second control section causes the management server to control the operation of the electric appliance inside the house of the members' in accordance with the operation instruction; and the response message generated by the message generating section is a message indicating that the operation of the electric appliance inside the house of the members' has been controlled in accordance with the operation instruction.

The above arrangement allows a member to post onto the family message board an instruction to operate a particular household electric appliance. The above arrangement thus eliminates the need to inform other members of the instruction entered to operate that household electric appliance.

A terminal of one aspect of the present invention is a terminal for (i) posting a message onto an electric message board for use in communication between members of a group and for (ii) viewing the message posted on the electric message board, the terminal including: an input section at which a member of the group inputs a message to be posted onto the electric message board; and a display section for displaying the message, obtained from the electric message board, for any member of the group to view the message posted on the electric message board, the message displayed by the display section including a response message generated in correspondence with a result of analyzing (I) at least either of (i) sensor information generated by a sensor provided inside a house of the members and (ii) operation information on an electric appliance provided inside the house of the members, the operation information having been generated by the electric appliance, and (II) external information obtained from outside.

The above arrangements each allow a message to be originated to be directed to a user, the message corresponding to a combination of (I) at least either of (i) sensor information generated by a sensor provided inside the house and (ii) operation information on a household electric appliance, the operation information having been generated by that electric appliance, and (II) external information. The above arrangements thus each eliminate the need for the user to personally gather (I) information such as (i) sensor information generated by a household sensor provided to an individual household electric appliance or the like and (ii) operation information on a household electric appliance, the operation information having been generated by that electric appliance, or (II) external information obtained through the Internet or the like.

The terminal of one aspect of the present invention may be arranged such that the response message included in the message displayed by the display section is generated in correspondence with a result of analyzing content of the message inputted at the input section and posted on the electric message board.

The above arrangement allows a message to be displayed, the message corresponding to the content of a message posted by a member onto the electric message board. The above arrangement thus enables two-way communication between the message originating server and the terminal.

A terminal of the one aspect of the present invention is a terminal for (i) posting a message onto an electric message board for use in communication between members of a group and for (ii) viewing the message posted on the electric message board, the terminal including: an input section at which a member of the group inputs a message to be posted onto the electric message board; and a display section for displaying the message, obtained from the electric message board, for any member of the group to view the message posted on the electric message board, the message inputted at the input section including an operation instruction for causing a control section for controlling operation of an electric appliance inside a house of the members to control the operation of the electric appliance.

The terminal of one aspect of the present invention may be arranged such that the message displayed by the display section includes a response message generated in correspondence with a result of analyzing the operation of the electric appliance.

The above arrangement allows the message displayed by the display section to include a response message generated in correspondence with the result of analyzing the operation of the electric appliance. The above arrangement thus eliminates the need to inform other members of the instruction entered to operate that household electric appliance.

A message originating server of one aspect of the present invention is a message originating server for originating a message to be directed to a user, the message originating server including: a message generating section for generating a message for the user; and a control section for (i) arranging the message in such a manner as to allow the user to feel as if an electric appliance inside a house of the user's is originating the message and (ii) originating the message.

A message originating system of one aspect of the present invention is a message originating system including a message originating server for originating a message to be directed to a user, the message originating server including: a message generating section for generating a message for the user; and a control section for originating the message in such a manner as to allow the user to feel as if an electric appliance inside a house of the user's is originating the message.

A message originating method of one aspect of the present invention is a message originating method for use by a message originating server for originating a message to be directed to a user, the message originating method including the steps of: (a) generating a message for the user; and (b) originating the message in such a manner as to allow the user to feel as if an electric appliance inside a house of the user's is originating the message.

The above arrangements, by originating a message in such a manner as to allow a user to feel as if a household electric appliance of the user's is originating the message, each allow the user to feel as if the user is communicating with the household electric appliance. The above arrangements thus each allow the user to feel more familiar with and thus easily understand a message originated by a message originating server of one aspect of the present invention.

The message originating server of one aspect of the present invention may further include: an information obtaining section for obtaining sensor information generated by a sensor provided inside the house of the user's; and an analyzing section for analyzing the sensor information, wherein the message generated by the message generating section corresponds to a result of the analysis of the sensor information by the analyzing section.

The message originating server of one aspect of the present invention may be arranged such that the sensor is included in the electric appliance.

The message originating server of one aspect of the present invention may be arranged such that the information obtaining section further obtains operation information on the electric appliance, the operation information having been generated by the electric appliance; the analyzing section further analyzes the operation information on the electric appliance; and the message generated by the message generating section further corresponds to a result of the analysis of the operation information by the analyzing section.

The message originating server of one aspect of the present invention may further include: an external information obtaining section for obtaining external information from outside, wherein: the analyzing section further analyzes the external information; and the message generated by the message generating section further corresponds to a result of the analysis of the external information by the analyzing section.

The above arrangements each allow a message to be originated to be directed to a user, the message corresponding to (i) sensor information generated by a sensor provided to an electric appliance or the like inside the house of the user's, (ii) operation information on an electric appliance, the operation information having been generated by that electric appliance, or (iii) external information obtained from outside. The above arrangements thus each eliminate the need for the user to personally gather (I) information such as (i) sensor information generated by a household sensor provided to an individual household electric appliance or the like and (ii) operation information on an individual household electric appliance or (II) external information obtained through the Internet or the like. The above arrangement is therefore practical.

The message originating server of one aspect of the present invention may be arranged such that the control section causes an electric message board server, which manages posting of a message onto an electric message board for use in communication between members of a group including the user, to post the message, generated by the message generating section, onto the electric message board in such a manner as to allow a member to feel as if the electric appliance inside the house of the members' is posting the message.

The message originating server of one aspect of the present invention may be arranged such that the control section causes the electric message board server to use, as a symbol to accompany the message that the control section causes the electric message board server to post onto the electric message board, a symbol representing the electric appliance inside the house of the members'.

The above arrangement allows a member to feel as if a household electric appliance of the member's is posting a message onto the electric message board. The above arrangement thus allows a member to feel more familiar with and thus easily understand a message posted by the electric message board server onto the electric message board.

The message originating server of one aspect of the present invention may be arranged such that the control section causes a management server for managing operation of the electric appliance inside the house of the user's to output, from a loudspeaker of the electric appliance, the message in a form of a voice.

The above arrangement allows a user to feel as if a household electric appliance of the user's is speaking. The above arrangement thus allows the user to feel more familiar with and thus easily understand a message outputted by the management server in the form of a voice.

A terminal of one aspect of the present invention is a terminal for (i) posting a message onto an electric message board for use in communication between members of a group and for (ii) viewing the message posted on the electric message board, the terminal including: an input section at which a member of the group inputs a message to be posted onto the electric message board; and a display section for displaying the message, obtained from the electric message board, for any member of the group to view the message posted on the electric message board, the message displayed by the display section being arranged in such a manner as to allow the members to feel as if an electric appliance inside a house of the members' is originating the message.

The terminal of one aspect of the present invention may be arranged such that the message displayed by the display section is accompanied by a symbol representing the electric appliance inside the house of the members'.

The above arrangement allows a member to feel as if a household electric appliance of the member's is posting a message onto the electric message board. The above arrangement thus allows a member to feel more familiar with and thus easily understand a message posted by the electric message board server onto the electric message board.

An electric appliance control system of one aspect of the present invention is an electric appliance control system including: a message obtaining section for obtaining a message posted on an electric message board for use in communication between members of a group by a member of the group; an analyzing section for analyzing content of the message obtained by the message obtaining section; and a control section for, in a case where the message content analyzed by the analyzing section is an instruction to operate an electric appliance inside a house of the members', controlling operation of the electric appliance in accordance with the operation instruction.

The electric appliance control system of one aspect of the present invention may further include: a message generating section for generating a message indicating that the operation of the electric appliance has been controlled in accordance with the operation instruction, wherein: the control section posts onto the electric message board the message generated by the message generating section.

The above arrangement allows a member to post onto the family message board an instruction to operate a particular household electric appliance. The above arrangement thus eliminates the need to inform other members of the instruction entered to operate that household electric appliance.

The electric appliance control system of one aspect of the present invention may further include: a message generating section for generating a message indicating that the operation of the electric appliance has been controlled in accordance with the operation instruction, wherein: the electric appliance includes a loudspeaker; and the control section causes the message, generated by the message generating section, to be outputted from the loudspeaker of the electric appliance in a form of a voice.

The above arrangement allows a user to feel as if a household electric appliance of the user's is speaking. The above arrangement thus allows the user to feel more familiar with and thus easily understand a message outputted by the management server in the form of a voice.

An electric appliance of one aspect of the present invention is an electric appliance including: a loudspeaker, the electric appliance causing the loudspeaker to output a message in a form of a voice, the message being a message generated by a message generating section in correspondence with a result of analyzing operation of the electric appliance, the operation of the electric appliance being operation carried out in accordance with an operation instruction for the electric appliance, the operation instruction being included in a message posted on an electric message board for use in communication between members of a group, the electric appliance outputting the generated message from the loudspeaker in the form of a voice in accordance with an instruction from a control section for controlling the operation of the electric appliance.

The above arrangement allows a member to post onto the family message board an instruction to operate a particular household electric appliance. The above arrangement thus eliminates the need to inform other members of the instruction entered to operate that household electric appliance. Further, the above arrangement allows a user to feel as if a household electric appliance of the user's is speaking. The above arrangement thus allows the user to feel more familiar with and thus easily understand a message outputted by the management server in the form of a voice.

The above message originating servers may each be in the form of a computer. In the case where a message originating server of one aspect of the present invention is in the form of a computer, the present invention includes in its scope a program for causing a computer to operate as each of the sections to provide either of the message originating servers in the form of a computer.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

A message originating server, message originating method, terminal, electric appliance control system, and electric appliance of one aspect of the present invention are suitably used respectively as a server, method, terminal, electric appliance control system, and electric appliance that each provide an electric message board for use in communication between members registered on a group.

Further, a message originating server, message originating method, terminal, electric appliance control system, and electric appliance of one aspect of the present invention are suitably used respectively as a server, method, terminal, electric appliance control system, and electric appliance each for personifying a household electric appliance of a user's.

REFERENCE SIGNS LIST 1 control server
2 family message board server
3 management server
4 external information server
5a to 5c portable terminal
6 cleaning robot
7 air conditioner
8 illumination device
9 television
10 sensor
11 communication section
12 appliance information obtaining section
13 external information obtaining section
14 message obtaining section
15 analyzing section
16 message generating section
17 body composition meter
100 household electric appliance control system

The invention claimed is:

1. A message originating server for originating a message to be directed to a user,
the message originating server comprising:
an information obtaining section for obtaining (i) sensor information generated by a sensor provided inside a house of the user's and (ii) operation information on an electric appliance provided inside the house of the user's, the operation information having been generated by the electric appliance;
an external information obtaining section for obtaining external information from outside;
an analyzing section for analyzing (i) at least either of the sensor information and the operation information and (ii) the external information;
a message generating section for generating a first message corresponding to a result of the information analysis by the analyzing section, the first message suggesting an operation recommended for a particular home electric appliance; and
a first control section for originating the first message generated by the message generating section, and
wherein:
the first control section causes a network service server, which manages posting of a message onto a network service for use in information exchange between members of a group including the user, to post the first message generated by the message generating section,
the message originating server further comprising:
a message obtaining section for obtaining a second message posted by a member of the group onto the network service,
wherein:
the analyzing section further analyzes content of the second message obtained by the message obtaining section;

the message generating section further generates a response message corresponding to a result of the analysis of the message content by the analyzing section; and the first control section originates the response message generated by the message generating section.

2. The message originating server according to claim 1, wherein:

the result of the information analysis indicates an operation recommended for an electric appliance inside the house of the members'; and the first message generated by the message generating section is a message that suggests the operation.

3. The message originating server according to claim 1, wherein:

the result of the information analysis indicates an operation recommended for an electric appliance inside the house of the members';

the first message generated by the message generating section is a message that suggests the operation;

the content of the second message posted by the member is an instruction to operate the electric appliance inside the house of the members';

the message originating server causes the management server, which manages the operation of the electric appliance inside the house of the members', to control the operation of the electric appliance inside the house of the members' in accordance with the operation instruction; and the response message generated by the message generating section is a message indicating that the operation of the electric appliance inside the house of the members' has been controlled in accordance with the operation instruction.

4. A message originating method for use by a message originating server for originating a message to be directed to a user, the message originating method comprising the steps of:

(a) obtaining (i) sensor information generated by a sensor provided inside a house of the user's and (ii) operation information on an electric appliance provided inside the house of the user's, the operation information having been generated by the electric appliance;

(b) obtaining external information from outside;

(c) analyzing (i) at least either of the sensor information and the operation information and (ii) the external information;

(d) generating a first message corresponding to a result of the information analysis during the step (c), the first message suggesting an operation recommended for a particular home electric appliance;

(e) originating the first message generated during the step (d) onto a network service for use in information exchange between members of a group including the user;

(f) obtaining a second message posted by a member of the group onto the network service;

(g) analyzing content of the second message posted by a member of the group onto the network service, (h) generating a response message corresponding to a result of the analysis during the step (g); and (i) originating the response message generated during the step (h).

5. A terminal for (i) posting a message onto a network service for use in information exchange between members of a group and for (ii) viewing the message posted on the network service, the terminal comprising:

an input section at which a member of the group inputs a message to be posted onto the network service; and a display section for displaying the message, obtained from the network service, for any member of the group to view the message posted on the network service, the message displayed by the display section including a first message generated in correspondence with a result of analyzing (I) at least either of (i) sensor information generated by a sensor provided inside a house of the members and (ii) operation information on an electric appliance provided inside the house of the members, the operation information having been generated by the electric appliance, and (II) external information obtained from outside, and the first message suggesting an operation recommended for a particular home electric appliance, the message displayed by the display section also including a second message inputted at the input section by the member of the group and posted on the network service, the message displayed by the display section also including a response message generated in correspondence with a result of analyzing content of the second message.

6. A terminal for (i) posting a message onto a network service for use in information exchange between members of a group and for (ii) viewing the message posted on the network service, the terminal comprising:

an input section at which a member of the group inputs a message to be posted onto the network service; and a display section for displaying the message, obtained from the network service, for any member of the group to view the message posted on the network service, the message inputted at the input section including a first message including an operation instruction for causing a control section for controlling operation of an electric appliance inside a house of the members to control the operation of the electric appliance, wherein the message displayed by the display section includes a second message generated in correspondence with a result of analyzing the operation of the electric appliance, and the second message suggests an operation recommended for a particular home electric appliance, the message displayed by the display section also includes a response message generated in correspondence with a result of analyzing content of the first message including the operation instruction.

7. A message originating server for originating a message to be directed to a user, the message originating server comprising:

a message generating section for generating a message for the user; and a control section for (i) arranging the message in such a manner as to allow the user to feel as if an electric appliance inside a house of the user's is originating the message and (ii) originating the message, wherein the control section originates the message including an expression implying that the electric appliance is a generator of the message, the message originating server is an individual member different from the electric appliance, the control section causes a network service server, which manages posting of a message onto a network service for use in information exchange between members of a group including the user, to post the message, generated by the message generating section, onto the network service in such a manner as to allow a member to feel as if the electric appliance inside the house of the members' is posting the message, the control section causes the network service server to use, as a symbol to accompany the message that the control section causes the network server to post onto the network service, a symbol representing the electric appliance inside the house of the members'.

8. The message originating server according to claim 7, wherein the control section causes a management server for managing operation of the electric appliance inside the house of the user's to output, from a loudspeaker of the electric appliance, the message in a form of a voice.

9. A message originating method for use by a message originating server for originating a message to be directed to a user, the message originating method comprising the steps of:
(a) generating a message for the user; and
(b) (i) arranging the message in such a manner as to allow the user to feel as if an electric appliance inside a house of the user's is originating the message and (ii) originating the message,
wherein the originating step includes originating the message including an expression implying that the electric appliance is a generator of the message,
the message originating server is an individual member different from the electric appliance,
the originating step includes causing a network service server, which manages posting of a message onto a network service for use in information exchange between members of a group including the user, to post the message, generated during the step (a), onto the network service in such a manner as to allow a member to feel as if the electric appliance inside the house of the members' is posting the message,
the originating step includes causing the network service server to use, as a symbol to accompany the message the network service server posts onto the network service, a symbol representing the electric appliance inside the house of the members'.

10. A terminal for (i) posting a message onto a network service for use in information exchange between members of a group and for (ii) viewing the message posted on the network service, the terminal comprising:
an input section at which a member of the group inputs a message to be posted onto the network service; and
a display section for displaying the message, obtained from the network service, for any member of the group to view the message posted on the network service,
the message displayed by the display section being arranged in such a manner as to allow the members to feel as if an electric appliance inside a house of the members' is originating the message by including, in the message, an expression implying that the electric appliance is a generator of the message, and
the generator of the message being an individual member different from the electric appliance,
the message displayed by the display section being accompanied by a symbol representing the electric appliance inside the house of the members'.

11. The terminal according to claim 10,
wherein:
the message displayed by the display section is accompanied by a symbol representing the electric appliance inside the house of the members'.

12. An electric appliance control system comprising:
a message obtaining section for obtaining a message posted on a network service for use in information exchange between members of a group by a member of the group;
an analyzing section for analyzing content of the message obtained by the message obtaining section; and
a control section for, in a case where the content of a first message analyzed by the analyzing section is an instruction to operate an electric appliance inside a house of the members', controlling operation of the electric appliance in accordance with the operation instruction, wherein
in correspondence with a result of analyzing (i) at least either of sensor information and operation information, and (ii) external information, the control section posts, on the network service, a second message suggesting an operation recommended for a particular home electric appliance,
the control section also posts, on the network service, as response message corresponding to a result of analyzing content of the first message by the analyzing section.

13. The electric appliance control system according to claim 12, further comprising:
a message generating section for generating a message indicating that the operation of the electric appliance has been controlled in accordance with the operation instruction,
wherein:
the control section posts onto the network service the message generated by the message generating section.

14. The electric appliance control system according to claim 12, further comprising:
a message generating section for generating a message indicating that the operation of the electric appliance has been controlled in accordance with the operation instruction,
wherein:
the electric appliance includes a loudspeaker; and
the control section causes the message, generated by the message generating section, to be outputted from the loudspeaker of the electric appliance in a form of a voice.

15. An electric appliance comprising:
a loudspeaker,
the electric appliance causing the loudspeaker to output a message in a form of a voice,
the message being a first message generated by a message generating section in correspondence with a result of analyzing operation of the electric appliance, the message suggesting an operation recommended for a particular home electric appliance,
the electric appliance carrying out the operation in accordance with an operation instruction for the electric appliance, the operation instruction being included in a second message posted on a network service for use in information exchange between members of a group,
the message also being a response message generated by a message generating section in correspondence with a result of analyzing content of the second message posted on the network service, the electric appliance outputting the generated response message from the loudspeaker in the form of a voice in accordance with an instruction from a control section for controlling the operation of the electric appliance.

* * * * *